US009855944B2

(12) United States Patent
Björkman et al.

(10) Patent No.: US 9,855,944 B2
(45) Date of Patent: Jan. 2, 2018

(54) METHOD FOR CONTROLLING A HYBRID DRIVELINE

(71) Applicant: Scania CV AB, Södertälje (SE)

(72) Inventors: Mathias Björkman, Tullinge (SE);
Niklas Pettersson, Stockholm (SE);
Johan Lindström, Nyköping (SE);
Mikael Bergquist, Huddinge (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/124,842

(22) PCT Filed: Mar. 17, 2015

(86) PCT No.: PCT/SE2015/050301
§ 371 (c)(1),
(2) Date: Sep. 9, 2016

(87) PCT Pub. No.: WO2015/142261
PCT Pub. Date: Sep. 24, 2015

(65) Prior Publication Data
US 2017/0015304 A1    Jan. 19, 2017

(30) Foreign Application Priority Data

Mar. 20, 2014 (SE) ...................................... 1450327

(51) Int. Cl.
*B60W 10/02*    (2006.01)
*F16H 37/04*    (2006.01)
(Continued)

(52) U.S. Cl.
CPC .............. *B60W 20/30* (2013.01); *B60K 1/02* (2013.01); *B60K 6/365* (2013.01); *B60K 6/40* (2013.01);
(Continued)

(58) Field of Classification Search
None
See application file for complete search history.

(56) References Cited

U.S. PATENT DOCUMENTS 5,730,676 A   3/1998 Schmidt
6,558,283 B1  5/2003 Schnelle
(Continued)

FOREIGN PATENT DOCUMENTS

DE   102006025525 A1   12/2007
DE   102008043732 A1   6/2009
(Continued)

OTHER PUBLICATIONS

International Search Report for PCT/SE2015/050301 dated Jun. 23, 2015.
(Continued)

*Primary Examiner* — Colby M Hansen
(74) *Attorney, Agent, or Firm* — Moore & Van Allen PLLC; W. Kevin Ransom

(57) ABSTRACT

A method is provided for controlling a hybrid powertrain, comprising a combustion engine; a gearbox with input and output shafts; a first planetary gear connected to the input; a second planetary gear connected to the first planetary gear; first and second electrical machines capable of operating each other and respectively connected to the first planetary gear and to the second planetary gear; one gear pair connected with the first planetary gear and the output shaft; and one gear pair connected with the second planetary gear and the output shaft. The method comprising, while the combustion engine is operating: ensuring that gears are engaged in the one gear pair connected with the first planetary gear and the one gear pair connected with the second planetary
(Continued)

gear, and activating the first and second electrical machines so that total emitted electrical power is zero and a torque is generated in the output shaft.

16 Claims, 6 Drawing Sheets

(51) Int. Cl.
| | |
|---|---|
| B60K 6/442 | (2007.10) |
| B60W 10/115 | (2012.01) |
| B60W 20/30 | (2016.01) |
| B60K 1/02 | (2006.01) |
| B60K 6/365 | (2007.10) |
| B60K 6/40 | (2007.10) |
| B60K 6/445 | (2007.10) |
| B60K 6/547 | (2007.10) |
| B60W 10/06 | (2006.01) |
| B60W 10/08 | (2006.01) |
| B60W 10/113 | (2012.01) |
| B60W 20/00 | (2016.01) |
| F16H 3/72 | (2006.01) |
| F16H 3/00 | (2006.01) |
| F16H 37/10 | (2006.01) |

(52) U.S. Cl.
CPC ............ *B60K 6/442* (2013.01); *B60K 6/445* (2013.01); *B60K 6/547* (2013.01); *B60W 10/02* (2013.01); *B60W 10/06* (2013.01); *B60W 10/08* (2013.01); *B60W 10/113* (2013.01); *B60W 10/115* (2013.01); *B60W 20/00* (2013.01); *F16H 3/728* (2013.01); *F16H 37/042* (2013.01); *F16H 37/046* (2013.01); *B60Y 2200/92* (2013.01); *B60Y 2300/70* (2013.01); *F16H 3/006* (2013.01); *F16H 2003/008* (2013.01); *F16H 2037/102* (2013.01); *Y02T 10/6239* (2013.01); *Y10S 903/911* (2013.01); *Y10S 903/919* (2013.01); *Y10S 903/945* (2013.01)

(56) References Cited

U.S. PATENT DOCUMENTS

| | | | |
|---|---|---|---|
| 6,805,648 B1 | 10/2004 | Ehrlinger | |
| 8,226,513 B2 | 7/2012 | Abe et al. | |
| 2002/0045507 A1 | 4/2002 | Bowen | |
| 2002/0088288 A1 | 7/2002 | Bowen | |
| 2003/0166429 A1* | 9/2003 | Tumback | B60K 6/445 |
| | | | 475/5 |
| 2005/0072609 A1 | 4/2005 | Eisenhardt et al. | |
| 2005/0126836 A1 | 6/2005 | Bischoff | |
| 2005/0227803 A1 | 10/2005 | Holmes | |
| 2005/0256629 A1 | 11/2005 | Tao et al. | |
| 2007/0087894 A1 | 4/2007 | Tsuneyoshi et al. | |
| 2007/0099738 A1 | 5/2007 | Holmes | |
| 2007/0125083 A1 | 6/2007 | Rollinger et al. | |
| 2008/0103002 A1* | 5/2008 | Holmes | B60K 6/40 |
| | | | 475/5 |
| 2008/0224478 A1 | 9/2008 | Tamor | |
| 2008/0245167 A1 | 10/2008 | Gitt | |
| 2008/0269000 A1 | 10/2008 | Abe et al. | |
| 2008/0300082 A1 | 12/2008 | Abe | |
| 2009/0037060 A1 | 2/2009 | Carlhammar et al. | |
| 2009/0076694 A1 | 3/2009 | Tabata et al. | |
| 2009/0118925 A1 | 5/2009 | Hsieh et al. | |
| 2009/0320629 A1 | 12/2009 | Akashi et al. | |
| 2010/0006360 A1 | 1/2010 | Kishimoto | |
| 2010/0012405 A1 | 1/2010 | Katsuta et al. | |
| 2010/0029428 A1 | 2/2010 | Abe et al. | |
| 2010/0029436 A1* | 2/2010 | Katsuta | B60K 6/36 |
| | | | 477/5 |
| 2010/0045220 A1 | 2/2010 | Yamada et al. | |
| 2010/0078238 A1* | 4/2010 | Oba | B60K 6/40 |
| | | | 180/65.225 |
| 2010/0125019 A1 | 5/2010 | Tabata et al. | |
| 2012/0197475 A1 | 8/2012 | Akutsu et al. | |
| 2012/0226401 A1 | 9/2012 | Naito | |
| 2013/0006489 A1 | 1/2013 | Kim | |
| 2013/0190132 A1 | 7/2013 | Izawa | |
| 2013/0233268 A1 | 9/2013 | Yamaguchi et al. | |
| 2013/0260936 A1 | 10/2013 | Takei et al. | |
| 2016/0091063 A1* | 3/2016 | Rekow | B60L 1/006 |
| | | | 475/153 |
| 2017/0008510 A1* | 1/2017 | Imamura | B60W 20/13 |
| 2017/0015303 A1 | 1/2017 | Björkman et al. | |
| 2017/0028982 A1* | 2/2017 | Bjorkman | B60K 6/365 |

FOREIGN PATENT DOCUMENTS

| | | |
|---|---|---|
| DE | 102008032320 A1 | 1/2010 |
| DE | 102009000723 A1 | 8/2010 |
| EP | 1199204 A1 | 4/2002 |
| EP | 1275547 A2 | 1/2003 |
| EP | 1280677 A1 | 8/2004 |
| EP | 1126987 A1 | 8/2005 |
| EP | 1157873 A2 | 2/2006 |
| EP | 2113434 A1 | 11/2009 |
| JP | 2011084116 A | 4/2011 |
| WO | 0183249 A2 | 11/2001 |
| WO | 2008046185 A1 | 4/2008 |
| WO | 2008081893 A1 | 7/2008 |
| WO | 2009047540 A1 | 4/2009 |
| WO | 2012073651 A1 | 6/2012 |
| WO | 2013076566 A1 | 5/2013 |
| WO | 2014046580 A1 | 3/2014 |

OTHER PUBLICATIONS

Written Opinion of the International Search Authority for PCT/SE2015/050301 dated Jun. 23, 2015.

* cited by examiner

METHOD FOR CONTROLLING A HYBRID DRIVELINE

CROSS-REFERENCE TO RELATED REFERENCE(S)

This application is a national stage application (filed under 35 §U.S.C. 371) of PCT/SE15/050301, filed Mar. 17, 2015 of the same title, which, in turn claims priority to Swedish Application No. 1450327-0, filed Mar. 20, 2014 of the same title; the contents of each of which are hereby incorporated by reference.

FIELD OF THE INVENTION

The present invention relates to a method, vehicle and computer program product to control a hybrid powertrain.

BACKGROUND OF THE INVENTION

Hybrid vehicles may be driven by a primary engine, which may be a combustion engine, and a secondary engine, which may be an electrical machine. The electrical machine is equipped with at least one energy storage device, such as an electro-chemical energy storage device, for storage of electric power and control equipment to control the flow of electric power between the energy storage device and the electrical machine. The electrical machine may thus alternately operate as a motor and as a generator, depending on the vehicle's operating mode. When the vehicle is braked, the electrical machine generates electric power, which is stored in the energy storage device. This is usually referred to as regenerative braking, which entails that the vehicle is decelerated with the help of the electrical machine and the combustion engine. The stored electric power is used later for operation of the vehicle.

A gearbox in a hybrid vehicle may comprise a planetary gear. The planetary gearbox usually comprises three components, which are rotatably arranged in relation to each other, namely a sun wheel, a planetary wheel carrier and an internal ring gear. With knowledge about the number of cogs in the sun wheel and the internal ring gear, the mutual speeds of the three components may be determined during operation. One of the components of the planetary gear may be connected with an output shaft in a combustion engine. This component of the planetary gear thus rotates with a rotational speed corresponding to the rotational speed of the output shaft in the combustion engine. A second component in the planetary gear may be connected with an input shaft to a transmission device. This component of the planetary gear thus rotates with the same rotational speed as the input shaft to the transmission device. A third component in the planetary gear is used to achieve hybrid operation, connected with a rotor in an electrical machine. This component in the planetary gear thus rotates with the same rotational speed as the rotor of the electrical machine, if they are directly connected with each other. Alternatively, the electrical machine may be connected with the third component of the planetary gear via a transmission that has a gearing. In this case, the electrical machine and the third component in the planetary gear may rotate with different rotational speeds. The engine speed and/or the torque of the electrical machine may be controlled steplessly. During operating times when the input shaft to the transmission device must be provided with a rotational engine speed and/or torque, a control device having knowledge about the engine speed of the combustion engine calculates the rotational speed with which the third component must be operated, in order for the input shaft to the transmission device to obtain the desired rotational speed. A control device activates the electrical machine, so that it provides the third component with the calculated engine speed and thus the input shaft to the transmission device with the desired rotational speed.

By connecting the combustion engine's output shaft, the electrical machine's rotor and the input shaft of the transmission device with a planetary gear, the conventional clutch mechanism may be avoided. At acceleration of the vehicle, an increased torque must be delivered from the combustion engine and the electrical machine to the transmission device, and further along to the vehicle's driving wheels. Since both the combustion engine and the electrical machine are connected with the planetary gear, the largest possible torque delivered by the combustion engine and the electrical machine will be limited by one of these drive units; i.e. the one whose maximum torque is lower than the second drive unit's maximum torque, having regard to the gearing between them. In case the electrical machine's highest torque is lower than the combustion engine's highest torque, having regard to the gearing between them, the electrical machine will not be able to generate a sufficiently large reaction torque to the planetary gear, entailing that the combustion engine may not transfer its highest torque to the transmission device, and further along to the vehicle's driving wheels. Thus, the highest torque that may be transferred to the transmission device is limited by the electrical machine's strength. This is also apparent from the so-called planet equation.

Using a conventional clutch, which disconnects the gearbox's input shaft from the combustion engine during shifting processes in the gearbox, entails disadvantages, such as heating of the clutch's discs, resulting in wear of the clutch discs and an increased fuel consumption. A conventional clutch mechanism is also relatively heavy and costly. It also occupies a relatively large space in the vehicle.

In a vehicle, the space available for the drive arrangement is often limited. If the drive arrangement comprises several components, such as a combustion engine, an electrical machine, a gearbox and a planetary gear, the construction must be compact. If there are additional components, such as a regenerative braking device, the requirements that the component parts must have a compact construction are even more stringent. At the same time, the component parts in the drive arrangement must be designed with dimensions that are able to absorb the required forces and torque.

For some types of vehicles, especially heavy goods vehicles and buses, a large number of gear steps is required. Thus, the number of component parts in the gearbox increases, which must also be dimensioned to be able to absorb large forces and torque arising in such heavy goods vehicles. This results in an increase of the size and weight of the gearbox.

There are also requirements for high reliability and high dependability of the components comprised in the drive device. In case the gearbox comprises multi-plate clutches, a wear arises, which impacts the reliability and life of the gearbox.

At regenerative braking, kinetic energy is converted into electric power, which is stored in an energy storage device, such as accumulators. One factor impacting on the life of the energy storage device is the number of cycles in which the energy storage device provides and extracts power to and from the electric machines. The more cycles, the shorter the life of the energy storage device.

When driving a vehicle comprising a hybrid powertrain, the combustion engine and/or the electric motor may be used to accelerate the vehicle from a standstill state to a desired speed, in order to subsequently drive the vehicle with the desired speed. When the electric motor is used, power from an energy storage device is used to operate the electric motor. If the energy storage device fails or is discharged, the vehicle's operation becomes entirely dependent on the combustion engine's function.

Often, energy storage devices for hybrid powertrains have a considerable weight, which entails that the vehicle's fuel consumption increases.

The document EP-B1-1126987 shows a gearbox with double planetary gears. Each sun wheel of the planetary gear is connected to an electrical machine, and the internal wheels of the planetary gears are connected with each other. The planetary wheel carrier in each planetary gear is connected to a number of gear pairs, so that an infinite number of gear steps is obtained. Another document, EP-B1-1280677, also shows how the planetary gears may be bridged with a gear step arranged on the combustion engine's output shaft.

The document US-A1-20050227803 shows a vehicle transmission with two electrical machines, connected to the respective sun wheels in two planetary gears. The planetary gears have a common planetary wheel carrier, which is connected to the transmission's input shaft.

The document WO2008/046185-A1 shows a hybrid transmission with two planetary gears, wherein one electrical machine is connected to one of the planetary gears and a double clutch interacts with the second planetary gear. Both planetary gears also interact with each other via a cogwheel transmission.

SUMMARY OF THE INVENTION

Despite prior art solutions in the field, there is a need to further develop a hybrid powertrain, which is controlled without any impact from the energy storage device.

Another objective of the invention is to provide a novel and advantageous method to control a hybrid powertrain, without any impact from an energy storage device.

Another objective of the invention is to provide a novel and advantageous computer program to control a hybrid powertrain, without any impact from an energy storage device.

The electrical machines, which are connected to the planetary gears, may generate power and/or supply torque, depending on the desired operating mode. The electrical machines will according to the invention supply each other with power. The first and the second electrical machines are activated in such a way that the total electric power output from the first and second electrical machines is zero, and in such a way that a torque is generated in the output shaft. Thus, an energy storage device becomes superfluous. Thus, no energy storage device existing in the vehicle need be used.

In some applications, it may be advantageous not to equip the vehicle with an energy storage device. Energy storage devices are costly, have a considerable weight and are bulky. Even if the vehicle is, or will be, equipped with an energy storage device, there may arise situations wherein the energy storage device is insufficient, such as when there are operating problems, or in special operating conditions, such as extreme temperatures. Furthermore, energy storage devices may be taken out of operation during a certain production stage, or in connection with repair of the vehicle and the energy storage device. In that case, it is an advantage if the vehicle may be used with as normal a function as possible. By leading electric power from the first electrical machine to the second electrical machine via a switch, no electric power will be led to and from the energy storage device. Thus, conditions are created for an increased life of the energy storage device.

It is thus possible to control the hybrid powertrain and to drive the vehicle with the hybrid powertrain without using the energy storage device. Functions that are active when the combustion engine is switched off, will however not be possible to realise without any participation by the energy storage device.

When the energy storage device is disconnected, or when the vehicle is not equipped with an energy storage device in the operating situation of moving off, the first electrical machine is used to control the voltage between the electrical machines. The second electric machine is controlled to emit the desired torque. Which one of the electrical machines that controls the voltage, and which one is controlled to a desired torque will vary, depending on the type of operating situation.

According to one embodiment of the invention, it is ensured that the first planetary gear's rotatable components are disconnected from each other, and that the second planetary gear's rotatable components are disconnected from each other. Accordingly, an efficient moving off of the vehicle, which is equipped with the hybrid powertrain, is facilitated. The vehicle is moved off from a standstill state of the vehicle, or from a state where the vehicle is travelling at a low speed. When the vehicle's driver moves a speed control to a desired state, the electrical machines are controlled in such a way that a torque is generated in the output shaft. The vehicle will then accelerate to the desired speed with the help of the energy from the combustion engine. While moving off the vehicle, the planetary gears' rotatable components are disconnected from each other and a suitable gear is engaged in the gearbox. According to this embodiment, the first electrical machine controls the voltage between the electrical machines, while simultaneously the second electrical machine is controlled to emit a predetermined torque.

According to another embodiment of the method, it is ensured that the first planetary gear's rotatable components are locked with each other, and that the second planetary gear's rotatable components are disconnected from each other. Thus, the first electrical machine controls the voltage between the electrical machines, while simultaneously the second electrical machine is controlled to emit a predetermined torque. This operating mode may arise at certain gear steps in the gearbox.

According to another embodiment of the method, it is ensured that the first planetary gear's rotatable components are disconnected from each other, and that two of the second planetary gear's rotatable components are locked with each other. Thus, the second electrical machine controls the voltage between the electrical machines, while simultaneously the first electrical machine is controlled to emit a predetermined torque. This operating mode may arise at certain gear steps in the gearbox.

According to another embodiment of the method, the first electrical machine is activated to exert a first torque, and the second electrical machine is activated to exert a second torque, wherein the size of the first and the second torque influence the power transferred between the first and the second electrical machine. When the total power from the electrical machines cancel each other out, and the sum of the power output is zero, the energy storage device will not be used. It is thus possible to select a first and a second torque, which the electrical machines must generate to obtain a certain power output in each one of the electrical machines, wherein the sum of the power output from the first and second electrical machine is zero. However, the power and torque are limited by the performance of the respective electrical machines.

By providing a first planetary wheel carrier in the first planetary gear, connected with a second sun wheel in the second planetary gear; a first sun wheel in the first planetary gear, connected with the first main shaft; and a second planetary wheel carrier in the second planetary gear, connected with the second main shaft, a transmission that shifts gears without torque interruption may be achieved. Alternatively, both the planetary gears are connected to each other by way of the first planetary wheel carrier being connected with a second internal ring gear, arranged in the second planetary gear.

The gearbox may be equipped with a number of gear pairs, comprising cogwheels that may be mechanically locked with and released from a countershaft. Thus, a number of fixed gear steps is obtained, which may be shifted without torque interruption. The cogwheels that may be locked on the countershaft also result in a compact construction with high reliability and high dependability. Alternatively, pinion gears in the gear pairs may be arranged to be lockable and disconnectable on the first and/or second main shaft.

With the gearbox according to the invention conventional slip clutches between the combustion engine and the gearbox may be avoided.

A first and second coupling device is arranged between the planetary wheel carrier and the sun wheel of the respective planetary gears. The task of the coupling devices is to lock the respective planetary wheel carriers with the sun wheel. When the planetary wheel carrier and the sun wheel are connected with each other, the power from the combustion engine will pass through the planetary wheel carrier, the coupling device, the sun wheel and further along to the gearbox, which entails that the planetary wheels do not absorb any torque. This entails that the dimension of the planetary wheels may be adapted only to the electrical machine's torque instead of the combustion engine's torque, which in turn means the planetary wheels may be designed with smaller dimensions. Thus, a drive arrangement according to the invention is obtained, which has a compact construction, a low weight and a low manufacturing cost.

The coupling devices and the locking mechanisms preferably comprise an annular sleeve, which is shifted axially between a connected and a disconnected state. The sleeve encloses, substantially concentrically, the gearbox's rotating components and is moved between the connected and disconnected state with a power element. Thus, a compact construction is obtained, with a low weight and a low manufacturing cost.

In order to connect, with the first and the second coupling device, respectively, the sun wheel and the planetary wheel carrier of the respective planetary gear, the combustion engine and/or the first electrical machine and/or the second electrical machine is controlled in such a way that a synchronous rotational speed is achieved between the sun wheel and the planetary wheel carrier. When a synchronous rotational speed has been achieved, the coupling device is shifted, so that the sun wheel and the planetary wheel carrier become mechanically connected with each other.

In order to disconnect the respective planetary gear's planetary wheel carrier and sun wheel from each other, the first and/or second electrical machine is controlled, so that torque balance is achieved in the planetary gear. When torque balance has been achieved, the coupling device is shifted, so that the sun wheel and the planetary wheel carrier are no longer mechanically connected with to each other.

Torque balance relates to a state where a torque acts on an internal ring gear arranged in the planetary gear, representing the product of the torque acting on the planetary wheel carrier of the planetary gear and the gear ratio of the planetary gear, while simultaneously a torque acts on the planetary gear's sun wheel, representing the product of the torque acting on the planetary wheel carrier and (1—the planetary gear's gear ratio). In the event two of the planetary gear's component parts, i.e. the sun wheel, the internal ring gear or planetary wheel carriers, are connected with a coupling device, this coupling device does not transfer any torque between the planetary gear's parts when torque balance prevails. Accordingly, the coupling device may easily be shifted and the planetary gear's component parts be disconnected.

BRIEF DESCRIPTION OF THE DRAWINGS

Below is a description, as an example, of preferred embodiments of the invention with reference to the enclosed drawings, on which.

DETAILED DESCRIPTION OF PREFERRED EMBODIMENTS OF THE INVENTION

Figure 1:
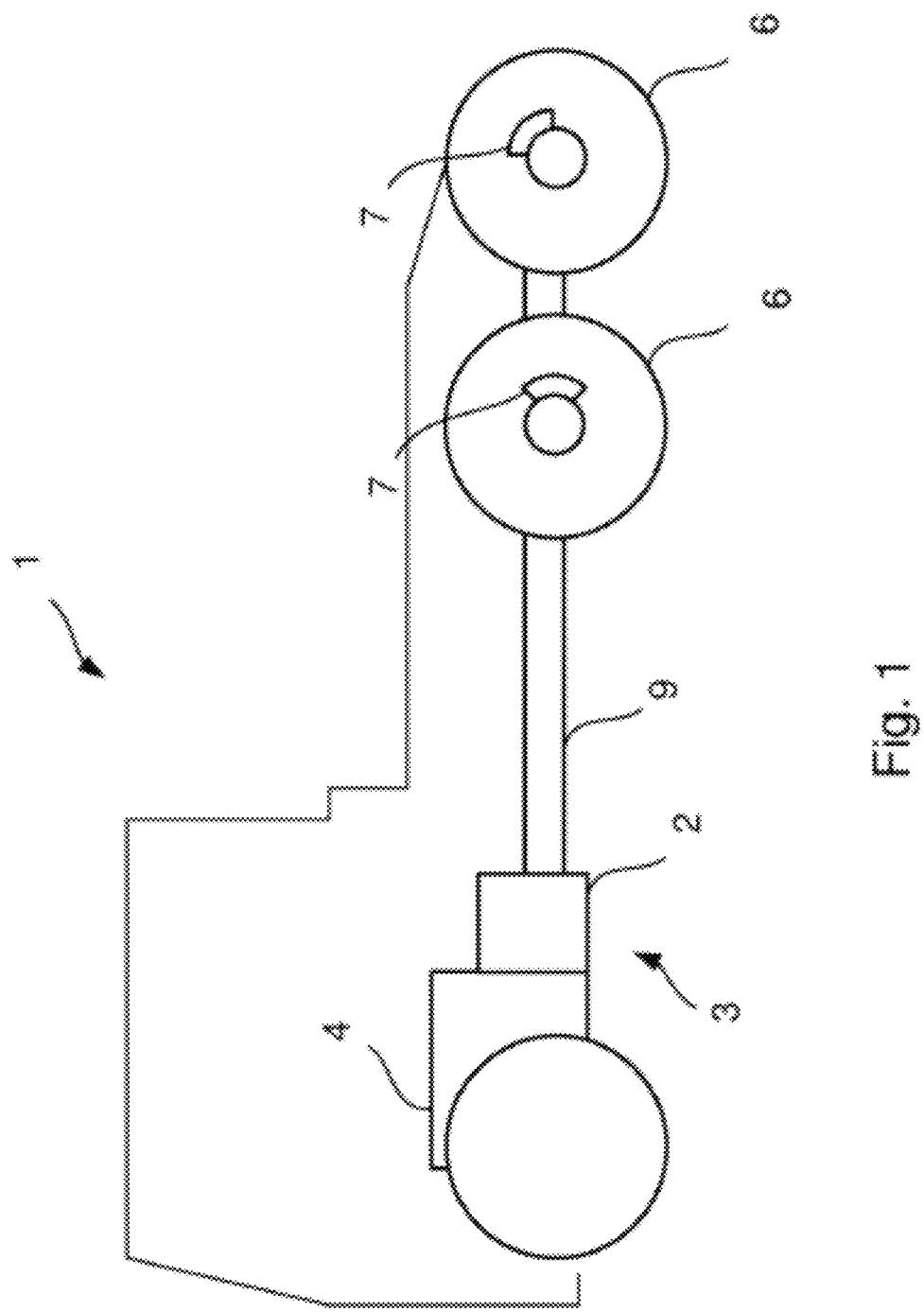
FIG. 1 schematically shows a vehicle with a hybrid powertrain in a side view, arranged to be controlled according to the method according to the present invention.

FIG. 1 shows a schematic side view of a vehicle 1, comprising a gearbox 2 and a combustion engine 4, which are comprised in a hybrid powertrain 3. The combustion engine 4 is connected to the gearbox 2, and the gearbox 2 is further connected to the driving wheels 6 of the vehicle 1 via a propeller shaft 9. The driving wheels 6 are equipped with brake devices 7 to brake the vehicle 1.

Figure 2:
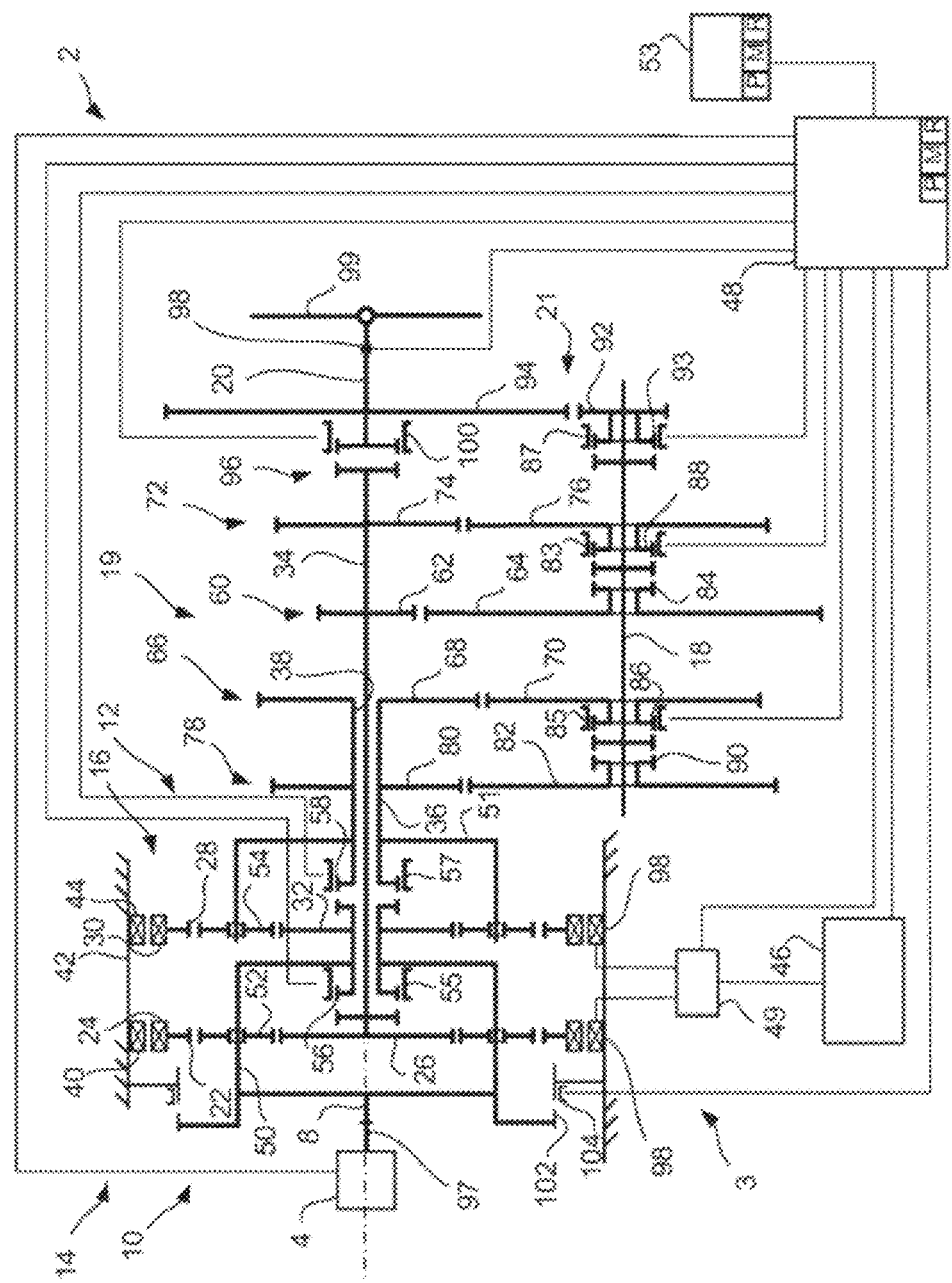
FIG. 2 shows a schematic side view of a hybrid powertrain, adapted to be controlled according to the method, according to the present invention.

FIG. 2 shows a schematic side view of a hybrid powertrain 3 with a gearbox 2, comprising an input shaft 8, a first and a second planetary gear 10 and 12, respectively, a first and a second electrical machine 14 and 16, respectively, a countershaft 18 and an output shaft 20. The hybrid powertrain comprises a combustion engine 4, connected to the gearbox 2. The combustion engine 4 is connected with the gearbox 2 via the input shaft 8 of the gearbox. The combustion engine has an output shaft 97. The output shaft 97 of the combustion engine 4 is connected to the input shaft of the gearbox 2. The first planetary gear 10 has a first internal ring gear 22, to which a first rotor 24 in the first electrical machine 14 is connected. The first planetary gear 10 also has a first sun wheel 26 and a first planetary wheel carrier 50. The first planetary gear 10 is connected to a first main shaft 34. The first main shaft 34 is connected with the first sun wheel 26, arranged in the first planetary gear 10. The second planetary gear 12 has a second internal ring gear 28, to which a second rotor 30 of the second electrical machine 16 is connected. The second planetary gear 12 has a second sun wheel 32 and a second planetary wheel carrier 51. The second planetary gear 12 is connected to a second main shaft 36. The first and the second sun wheels 26 and 32, respectively, are coaxially arranged, which, according to the embodiment displayed, entails that a first main shaft 34 arranged on the first sun wheel 26 extends inside a second main shaft 36, which is equipped with a central boring 38, arranged on the second planetary wheel carrier 51. It is also possible to arrange the first and second sun wheels 26 and 32, respectively, and also the first main shaft 34 and the second main shaft 36, in parallel with and next to each other. In this case, the countershaft 18 is suitably arranged between the first main shaft 34 and the second main shaft 36, and the torque may be extracted directly from the countershaft 18. The countershaft 18 thus constitutes, in this case, the output shaft 20.

The combustion engine 4 is connected with the first planetary wheel carrier 50, and the first planetary wheel carrier 50 is connected with the second sun wheel 32.

The first electrical machine 14 is equipped with a first stator 40, which is connected to the vehicle 1, via a gear housing 42 surrounding the gearbox 2. The second electrical machine 16 is equipped with a second stator 44, which is connected to the vehicle 1, via a gear housing 42 surrounding the gearbox 2. The first and the second electrical machine 16 are connected to an energy storage device 46, such as a battery, which, depending on the vehicle's 1 operating mode, operates the electrical machines 14 and 16, respectively. At other operating modes, the electrical machines 14 and 16, respectively, may work as generators, wherein power is supplied to the energy storage device 46. An electronic control device 48 is connected to the energy storage device 46 and controls the supply of power to the electrical machines 14 and 16, respectively. Preferably the energy storage device 46 is connected to the electrical machines 14 and 16, respectively, via a switch 49, which is connected to the control device 48. The electrical machines 14 and 16 may also operate each other. Electric power is then led from one of the electrical machines 14, 16 to the second electrical machine 14, 16 via the switch 49, connected to the electrical machines 14, 16. Thus, it is possible to achieve a power balance between the electrical machines 14, 16. Another computer 53 may also be connected to the control device 48 and the gearbox 2. By leading electric power from the first electrical machine 14, 16 to the second electrical machine 14, 16 via a switch 49, no electric power will be led to and from the energy storage device 46. Thus, conditions are created for an increased life of the energy storage device 46. While controlling the hybrid drive line, it is possible to select a first and a second torque, which the electrical machines 14, 16 must generate in order to obtain a certain power output in each one of the electrical machines 14, 16, wherein the sum of the power output from the first and second electrical machine 14, 16 is zero. The electrical machines 14, 16 will thus alternately supply each other with power during the control of the hybrid powertrain 3. It is therefore possible to control the hybrid powertrain 3 and to drive the vehicle 1 without the energy storage device 46.

The first planetary gear 10 is equipped with a first planetary wheel carrier 50, on which a first set of planetary wheels 52 is mounted. The second planetary gear 12 is equipped with a second planetary wheel carrier 51, on which a second set of planetary wheels 54 is mounted. The second main shaft 36 is connected with the second planetary wheel carrier 51, arranged in the second planetary gear 12. The first set of planetary wheels 52 interacts with the first internal ring gear 22 and the first sun wheel 26. The second set of planetary wheels 54 interacts with the second internal ring gear 28 and the second sun wheel 32. The input shaft 8 of the gearbox 2 is connected with the first planetary wheel carrier 50. The first planetary wheel carrier 50 in the first planetary gear 10 is directly and fixedly connected with the second sun wheel 32 of the second planetary gear 12. Thus, the first planetary wheel carrier 50 and the second sun wheel 32 will always have the same rotational direction and the same rotational speed.

A first coupling device 56 is arranged between the first sun wheel 26 and the first planetary wheel carrier 50. By arranging the first coupling device 56 in such a way that the first sun wheel 26 and the first planetary wheel carrier 50 are connected with each other, and may therefore not rotate in relation to each other, the first planetary wheel carrier 50 and the first sun wheel 26 will rotate with equal rotational speeds.

A second coupling device 58 is arranged between the second sun wheel 32 and the second planetary wheel carrier 51. By arranging the second coupling device 58 in such a way that the second sun wheel 32 and the second planetary wheel carrier 51 are connected with each other, and may therefore not rotate in relation to each other, the second planetary wheel carrier 51 and the first sun wheel 32 will rotate with equal rotational speeds.

Preferably, the first and second coupling devices 56, 58 comprise a first and a second splines-equipped coupling sleeve 55 and 57, respectively, which is axially shiftable on a splines-equipped section on the first and second, respectively, planetary wheel carrier 50 and 51, and on a splines-equipped section on the respective sun wheels 26 and 32. By shifting the respective coupling sleeve 55, 57 so that the splines-equipped sections are connected via the respective coupling sleeves 55, 57, the first planetary wheel carrier 50 and the first sun wheel 26, as well as the second planetary wheel carrier 51 and the second sun wheel 32, respectively, become mutually interlocked with each other and may not rotate in relation to each other.

The first and second coupling device 56, 58 according to the embodiment displayed in FIG. 2 are arranged between the first sun wheel 26 and the first planetary wheel carrier 50, and between the second sun wheel 28 and the second planetary wheel carrier 51, respectively. However, it is possible to arrange an additional or alternative coupling device (not displayed) between the first internal ring gear 22 and the first planetary wheel carrier 50, and also to arrange an additional or alternative coupling device (not displayed) between the second internal ring gear 28 and the second planetary wheel carrier 51.

The first planetary wheel carrier 50 of the first planetary gear 10 in this embodiment is fixedly connected with the second sun wheel 32 of the second planetary gear 12. Alternatively, the first planetary wheel carrier 50 is fixedly connected with the second internal ring gear 28 of the second planetary gear 12. Alternatively, the first main shaft 34 is connected with a first ring gear 22, arranged in the first planetary gear 10.

In this embodiment, a third coupling device 59 is arranged between the first ring gear 22 and the gear house 42. By actuating the third coupling device 59, so that the first ring gear 22 and the gear house 42 are connected with each other and accordingly may not rotate in relation to each other, a down-shift of torque will occur, that is to say an up-shift of the rotational speed from the planetary wheel carrier 50 to the first sun wheel 26 will occur.

In this embodiment, a fourth coupling device 61 is arranged between the second internal ring gear 28 and the gear house 42. By actuating the fourth coupling device 61, so that the second ring gear 28 and the gear house 42 are connected with each other and accordingly may not rotate in relation to each other, a down-shift of torque will occur, that is to say an up-shift of the rotational speed from the planetary wheel carrier 51 to the second sun wheel 32 will occur.

Preferably the third and fourth coupling device 59, 61 comprises a third and fourth splines equipped coupling sleeve 65 and 67, respectively, which are axially shiftable on the respective splines-equipped sections of the first and second ring gears 22 and 28, as well as on a splines-equipped section of the gear house 42. By shifting the respective coupling sleeves 65, 67 in such a way that the splines-equipped sections are connected via the respective coupling sleeves 65, 67, the first ring gear 22 and the gear house 42, and the second ring gear 28 and the gear house 42, respectively, are interlocked and may not rotate in relation to each other.

A transmission device 19, which comprises a first gear pair 60, arranged between the first planetary gear 10 and the output shaft 20 is connected to the first and the second main shaft 34, 36. The first gear pair 60 comprises a first pinion gear 62 and a first cogwheel 64, which are in engagement with each other. A second gear pair 66 is arranged between the second planetary gear 12 and the output shaft 20. The second gear pair 66 comprises a second pinion gear 68 and a second cogwheel 70, which are in engagement with each other. A third gear pair 72 is arranged between the first planetary gear 10 and the output shaft 20. The third gear pair 72 comprises a third pinion gear 74 and a third cogwheel 76, which are in engagement with each other. A fourth gear pair 78 is arranged between the second planetary gear 12 and the output shaft 20. The fourth gear pair 78 comprises a fourth pinion gear 80 and a fourth cogwheel 82, which are in engagement with each other.

On the first main shaft 34, the first and the third pinion gears 62 and 74, respectively, are arranged. The first and the third pinion gears 62 and 74, respectively, are fixedly connected with the first main shaft 34, so that they may not rotate in relation to the first main shaft 34. On the second main shaft 36, the second and the fourth pinion gears 68 and 80, respectively, are arranged. The second and the fourth pinion gears 68 and 80, respectively, are fixedly connected with the second main shaft 36, so that they may not rotate in relation to the second main shaft 36.

The countershaft 18 extends substantially in parallel with the first and the second main shaft 34 and 36, respectively. On the countershaft 18, the first, second, third and fourth cogwheels 64, 70, 76 and 82, respectively, are mounted. The first pinion gear 62 engages with the first cogwheel 64, the second pinion gear 68 engages with the second cogwheel 70, the third pinion gear 74 engages with the third cogwheel 76 and the fourth pinion gear 80 engages with the fourth cogwheel 82.

The first, second, third and fourth cogwheels 64, 70, 76 and 82, respectively, may be individually locked with and released from the countershaft 18 with the assistance of the first, second, third and fourth coupling elements 84, 86, 88 and 90, respectively. The coupling elements 84, 86, 88 and 90, respectively, preferably consist of splines-equipped sections on the cogwheels 64, 70, 76 and 82, respectively, and on the countershaft 18, which interact with fifth and sixth coupling sleeves 83, 85 which engage mechanically with the splines-equipped sections of the respective first to fourth cogwheel 64, 70, 76 and 82 and of the countershaft 18. The first and third coupling elements 84, 88 are preferably equipped with a common coupling sleeve 83, and the second and fourth coupling elements 86, 90 are preferably equipped with a common coupling sleeve 85. In the released state, a relative rotation may occur between the cogwheels 64, 70, 76 and 82 and of the countershaft 18. The coupling elements 84, 86, 88 and 90, respectively, may also consist of friction clutches. On the countershaft 18 a fifth cogwheel 92 is also arranged, which engages with a sixth cogwheel 94, which is arranged on the output shaft 20 of the gearbox 2.

The countershaft 18 is arranged between the respective first and second planetary gears 10, 12 and the output shaft 20, so that the countershaft 18 is connected with the output shaft 20 via a fifth gear pair 21, which comprises the fifth and the sixth cogwheel 92, 94. The fifth cogwheel 92 is arranged so it may be connected with and disconnected from the countershaft 18 with a fifth coupling element 93.

By disconnecting the fifth cogwheel 92, which is arranged to be disconnectable from the countershaft 18, it is possible to transfer torque from the second planetary gear 12 to the countershaft 18 via the second gear pair 66, and to further transfer torque from the countershaft 18 to the output shaft 20 via the first gear pair 60. Thus, a number of gear steps is obtained, wherein torque from one of the planetary gears 10, 12 may be transferred to the countershaft 18, and further along from the countershaft 18 to the main shaft 34, 36 connected with the second planetary gear 10, 12, finally to transfer torque to the output shaft 20 of the gearbox 2. This presumes, however, that a coupling mechanism 96 arranged between the first main shaft 34 and the output shaft 20 is connected, which is described in more detail below.

The fifth cogwheel 92 may be locked to and released from the countershaft 18 with the assistance of a fifth coupling element 93. The coupling element 93 preferably consists of splines-equipped sections adapted on the fifth cogwheel 92 and the countershaft 18, which sections interact with a ninth coupling sleeve 87, which engages mechanically with the splines-equipped sections of the fifth cogwheel 92 and the countershaft 18. In the released state, a relative rotation may occur between the fifth cogwheel 92 and the countershaft 18. The fifth coupling element 93 may also consist of friction clutches.

At a number of gearing situations, wherein the ring gears of the planetary gears 10, 12 are locked with the gear house 42 with the assistance of the third and fourth coupling devices 59, 61, torque will be downshifted after the first planetary gear 10 and up-shifted after the second planetary gear 12. When the torque transfer over the first main shaft 34 via the countershaft 18 decreases after the first planetary gear 10, shafts, pinion gears and cogwheels connected thereto may be designed to be smaller, which makes the gearbox 2 more compact. A large number of gear steps may also be obtained without any need to arrange a number of additional gear pairs in the gearbox. Accordingly, the weight and cost of the gearbox 2 are also reduced. The fifth and sixth cogwheels 92 and 94, respectively, will function like a fifth gear pair 21, which, at certain gear steps, up-shifts the torque to the output shaft 20 of the gearbox 2.

Torque transfer from the input shaft 8 of the gearbox 2 to the output shaft 20 of the gearbox 2 may occur via the first or the second planetary gear 10 and 12, respectively, and the countershaft 18. The torque transfer may also occur directly via the first planetary gear 10, whose first sun wheel 26 is connected, via the first main shaft 34, to the output shaft 20 of the gearbox 2 via a coupling mechanism 96. The coupling mechanism 96 preferably comprises a splines-equipped seventh coupling sleeve 100, which is axially shiftable on the first main shaft 34 and on the splines-equipped sections of the output shaft 20. By shifting the seventh coupling sleeve 100, so that the splines-equipped sections are connected via the seventh coupling sleeve 100, the first main shaft 34 becomes locked with the output shaft 20, which, when rotating, will therefore have the same rotational speed. By disconnecting the fifth cogwheel 92 of the fifth gear pair 21 from the countershaft 18, torque from the second planetary gear 12 may be transferred to the countershaft 18, and further along from the countershaft 18 to the first main shaft 34, connected with the first planetary gear 10, in order finally to transfer torque via the coupling mechanism 96 to the output shaft 20 of the gearbox 2.

In some operating modes the gearbox 2 may operate so that one of the sun wheels 26 and 32, respectively, are locked with the first and the second planetary wheel carrier 50 and 51, respectively, with the help of the first and the second coupling device 56 and 58, respectively. The first and the second main shaft 34 and 36, respectively, then obtain the same rotational speed as the input shaft 8 of the gearbox 2, depending on which sun wheel 26 and 32, respectively, is locked with the respective planetary wheel carriers 50 and 51. One or both of the electrical machines 14 and 16, respectively, may operate as a generator to generate electric power to the energy storage device 46. Alternatively, the electrical machine 14 and 16, respectively, may provide a torque injection, in order to thus increase the torque in the output shaft 20. At some operating times, the electrical machines 14 and 16, respectively, will supply each other with electric power, independently of the energy storage device 46.

In some operating modes the gearbox 2 may operate in such a way that one of the rotors 24 and 30, respectively, of the electrical machines 14 and 16, respectively, is locked with the gear house 42 via the respective ring gears 22 and 28, while the second electrical machine 14 and 16, respectively, operate as a generator to generate electric power to the energy storage device 46, which will be explained in more detail below. The electrical machine 14 and 16, respectively, whose respective rotor 24 and 30, is locked with the gear house 42, absorbs a reaction torque from the ring gear 22 and 28, respectively, so that torque balance prevails before the locking is carried out with the help of the third and fourth coupling devices 59 and 61, respectively. Instead of operating as a generator, the electrical machines 14 and 16, respectively, may provide a torque injection, in order to thus increase the torque in the output shaft 20. Torque balance comprises a substantially zero torque state on the one hand, and a counteracting torque on the other, in order for the coupling devices 59, 61 to be put into a state, wherein they do not transfer torque between the ring gears 22, 28 and the gear house 42.

It is also possible that the total reaction torque of both the first and the second electrical machine 14 and 16, respectively, generate power to the energy storage device 46. At engine braking the driver releases the accelerator pedal (not displayed) of the vehicle 1. The output shaft 20 of the gearbox 2 then operates one or both electrical machines 14 and 16, respectively, while the combustion engine 4 and the electrical machines 14 and 16, respectively, engine brake. The electrical machines 14 and 16, respectively, in this case generate electric power, which is stored in the energy storage device 46 in the vehicle 1. This operating state is referred to as regenerative braking. In order to facilitate more powerful braking effect the output shaft 97 of the combustion engine's 4 may be locked and thus be prevented from rotating. Thus, only one of or both the electrical machines 14 and 16, respectively, will function as brakes and 16 generate electric power, which is stored in the energy storage device 46. The locking of the output shaft 97 of the combustion engine 4 may also be carried out when the vehicle must accelerate by only one or both the electrical machines 14 and 16, respectively. If the torque of one or both of the respective electrical machines 14 and 16, respectively, overcomes, via the planetary gears 10, 12, the torque of the combustion engine 4 and having regard to the gearing between them, the combustion engine 4 will not be able to resist the large torque, h the electrical machines 14 and 16 generate, so that it becomes necessary to lock the output shaft 97 of the combustion engine's 4. The locking of the output shaft 97 of the combustion engine 4 is preferably carried out with a locking device 102, which is arranged between the first planetary wheel carrier 50 and the gear hosing 42. By locking the first planetary wheel carrier 50 and the gear housing 42, the output shaft 97 of the combustion engine 4 will also be locked, since the output shaft 97 of the combustion engines 4 is connected with the first planetary wheel carrier 50 via the input shaft 8 of the gearbox. The locking device 102 preferably comprises a splines-equipped eighth coupling sleeve 104, which is axially shiftable on a splines-equipped section of the first planetary wheel carrier 50, and on a splines-equipped section of the gear housing. By shifting the eight coupling sleeve 104 so that the splines-equipped sections are connected via the coupling sleeve 104, the first planetary wheel carrier 50, and therefore the output shaft 97 of the combustion engine 4 is prevented from rotating.

The control device 48 is connected to the electrical machines 14 and 16, respectively, to control the respective electrical machines 14 and 16, so that they, during certain operating times, use stored electric power to supply driving power to the output shaft 20 of the gearbox 2, and during other operating times use the kinetic energy of the output shaft 20 of the gearbox 2 to extract and store electric power. The control device 48 thus detects the rotational speed and/or the torque of the output shaft 97 of the combustion engine 4 via sensors 98 arranged at the electrical machines 14 and 16, respectively, and in the output shaft 20 of the gearbox 2, in order thus to gather information and to control the electrical machines 14 and 16, respectively, to operate as electric motors or generators. The control device 48 may be a computer with software suitable for this purpose. The control device 48 also controls the flow of power between the energy storage device 46 and the respective stators 40 and 44 of the electrical machines 14 and 16, respectively. At times when the electrical machines 14 and 16, respectively, operate as engines, stored electric power is supplied from the energy storage device 46 to the respective stators 40 and 44. At times when the electrical machines 14 and 16 operate as generators electric power is supplied from the respective stators 40 and 44 to the energy storage device 46. However, as stated above, the electrical machines 14 and 16, respectively, may, during certain operating times, supply each other with electric power, independently of the energy storage device 46.

The first, second, third and fourth coupling devices 56, 58, 59 and 61, respectively, the first, second, third, fourth and fifth coupling elements 84, 86, 88, 90 and 93, respectively, the coupling mechanism 96 between the first main shaft 34 and the output shaft 20, and the locking device 102 between the first planetary wheel carrier 50 and the gear housing 42, are connected to the control device 48 via their respective coupling sleeves. These components are preferably activated and deactivated by electric signals from the control device 48. The coupling sleeves are preferably shifted by non-displayed power elements, such as hydraulically or pneumatically operated cylinders. It is also possible to shift the coupling sleeves with electrically powered power elements.

The example embodiment in FIG. 2 shows four pinion gears 62, 68, 74 and 80, respectively, and four cogwheels 64, 70, 76 and 82, respectively, and two respective planetary gears 10 and 12, with associated electrical machines 14 and 16, respectively. However, it is possible to adapt the gearbox 2 with more or fewer pinion gears and cogwheels, and with more planetary gears with associated electrical machines.

Below, an up-shift from the first to the highest gear will be described, wherein the gearbox 2 is arranged in a vehicle 1. The up-shift occurs while the combustion engine 4 is in operation. The input shaft 8 of the gearbox 2 is connected with the output shaft 97 of the combustion engine 4 of the vehicle 1. The output shaft 20 of the gearbox 2 is connected to a driving shaft 99 in the vehicle 1. At idling of the combustion engine 4 and when the vehicle 1 is at a standstill, the input shaft 8 of the gearbox 2 rotates at the same time as the output shaft 20 of the gearbox 2 is at a standstill. The locking device 102 is deactivated, so that the output shaft 97 of the combustion engine 4 may rotate freely. Since the input shaft 8 of the gearbox 2 rotates, the first planetary wheel carrier 50 will also rotate, which entails that the first set of planetary wheels 52 will rotate. Since the first planetary wheel carrier 50 is connected to the second sun wheel 32, the second sun wheel 32, and thus also the second set of planetary wheels 54, will rotate. By not supplying power to, or extracting power from, the first and the second electrical machines 14 and 16, respectively, the first and the second internal rings 22 and 28, respectively, which are connected with the respective first and second rotor 24 and 30 of the electrical machines 14 and 16, respectively, will rotate freely, so that no torque is absorbed by the respective internal rings 22 and 28. The first, second, third and fourth coupling devices 56, 58, 59 and 61, respectively, are disconnected and thus not actuated. Thus, no torque will be transferred from the combustion engine 4 to the respective sun wheels 26 and 32 of the planetary gears 10 and 12. The coupling mechanism 96 between the first main shaft 34 and the output shaft 20 is disconnected, so that the first main shaft 34 and the output shaft 20 may rotate freely in relation to each other. Since the output shaft 20 of the gearbox 2 at this stage is at a standstill, the countershaft 18 is also at a standstill. In a first step the fourth cogwheel 82 and the third cogwheel 76 are connected with the countershaft 18 with the assistance of the fourth and third coupling elements 90 and 88, respectively. The first cogwheel 64 and the second cogwheel 70 are disconnected from the countershaft 18. Thus, the first cogwheel 64 and the second cogwheel 70 are allowed to rotate freely in relation to the countershaft 18. The fifth cogwheel 92 of the fifth gear pair 21 is locked on the countershaft 18 with the assistance of the fifth coupling element 93.

In order to start the rotation of the output shaft 20 of the gearbox 2, with the objective of driving the vehicle 1, the fourth pinion gear 80 and the fourth cogwheel 82 on the countershaft 18 must be brought to rotate. This is achieved by making the second planetary wheel carrier 51 rotate. When the second planetary wheel carrier rotates, the second main shaft 36 will also rotate, and thus the fourth pinion gear 80, which is arranged on the second main shaft 36, also rotates. The second planetary wheel carrier 51 is made to rotate by controlling the second internal ring gear 28 with the second electrical machine 16. By activating the second electrical machine 16 and controlling the combustion engine 4 to a suitable engine speed, the vehicle 1 begins to move as the second main shaft 36 begins to rotate. When the second planetary wheel carrier 51 and the second sun wheel 32 achieve the same rotational speed, the second sun wheel 32 is locked with the second planetary wheel carrier 51 with the assistance of the second coupling device 58. As mentioned above, the second coupling device 58 is preferably adapted in such a way that the second sun wheel 32 and the second planetary wheel carrier 51 engage mechanically with each other. Alternatively, the second coupling device 58 may be adapted as a slip brake or a multi-plate clutch which connects, in a smooth way, the second sun wheel 32 with the second planetary wheel carrier 51. When the second sun wheel 32 is connected with the second planetary wheel carrier 51, the second planetary wheel carrier 51 will rotate with the same rotational speed as the output shaft 97 of the combustion engine 4. Thus, the torque generated by the combustion engine 4 is transferred to the output shaft 20 of the gearbox 2 via the fourth pinion gear 80, the fourth cogwheel 82 on the countershaft 18, the fifth cogwheel 92 on the countershaft 18, and the sixth cogwheel 94 on the output shaft 20 of the gearbox 2. The vehicle 1 will thus begin to move off and be propelled by the first gear.

Each of the first, second, third and fourth gear pairs 60, 66, 72, 78 has a gearing, which is adapted to the vehicle's 1 desired driving characteristics. According to the example embodiment displayed in FIG. 2, the fourth gear pair 78 has the highest gearing compared to the first, second and third gear pairs 60, 66, 72, which results in the fourth gear pair 78 being connected when the lowest gear is engaged. The second gear pair 66 transfers, as does the fourth gear pair 78, torque between the second main shaft 36 and the countershaft 18, and could instead be fitted out with the highest gearing, compared with other gear pairs 60, 72, 78, which is why in such an embodiment the second gear pair 66 could be connected when the lowest gear is engaged.

When the countershaft 18 is made to rotate by the fourth cogwheel 82 on the countershaft 18, the third cogwheel 76 on the countershaft 18 will also rotate. Thus, the countershaft 18 operates the third cogwheel 76, which in turn operates the third pinion gear 74 on the first main shaft 34. When the first main shaft 34 rotates, the first sun wheel 26 will also rotate, and thus, depending on the rotational speed of the output shaft 97 of the combustion engine 4 and thus the rotational speed of the first planetary wheel carrier 50, it will cause the first internal ring gear 22 and the first rotor 24 of the first electrical machine 14 to rotate. It is thus possible to allow the first electrical machine 14 to operate as a generator to supply power to the energy storage device 46, and/or to supply power to the second electrical machine 16. It is also possible for the second electrical machine 16 to be operated as a generator. Alternatively, the first electrical machine 14 may emit a torque injection, by way of the control device 48 controlling the first electrical machine 14 to provide a driving torque.

In order to shift from a first gear to a second gear, the locking between the second sun wheel 32 and the second planetary wheel carrier 51 must cease, which is achieved by way of the first and/or the second electrical machine 14, 16 being controlled in such a way that torque balance prevails in the second planetary gear 12. Subsequently, the second coupling device 58 is controlled, so that it disconnects the second sun wheel 32 and the second planetary wheel carrier 51 from each other. The second planetary wheel carrier 51 and also the second main shaft 36 may rotate freely, which entails that the second sun wheel 32, the second planetary wheel carrier 51 and the second main shaft 36 no longer operate the fourth pinion gear 80, arranged on the second main shaft 36. This assumes that the second electrical machine 16 does not operate the second ring gear 28. The second gear is connected, by way of the control device 48 controlling the combustion engine 4, so that a synchronous rotational speed arises between the first planetary wheel carrier 50 and the first sun wheel 26, in order to achieve a locking between the first planetary wheel carrier 50 and the first sun wheel 26. This is achieved by way of controlling the first coupling device 56 in such a way that the first planetary wheel carrier 50 and the first sun wheel 26 are mechanically connected with each other. Alternatively, the first coupling device 56 may be adapted as a slip brake or a multi-plate clutch which connects, in a smooth way, the first sun wheel 26 with the first planetary wheel carrier 50. By synchronizing the control of the combustion engine 4 and the second and first electrical machine 14 and 16, respectively, a soft and disruption-free transition from the first to the second gear may be carried out.

The first main shaft 34 now rotates, operated by the output shaft 97 of the combustion engine 4, and the first main shaft 34 now operates the third pinion gear 74. Thus, the first planetary wheel carrier 50 now operates the third pinion gear 74, via the first sun wheel 26 and the first main shaft 34. Since the third cogwheel 76 is in engagement with the third pinion gear 74 and is connected with the countershaft 18, the third cogwheel 76 will operate the countershaft 18, which in turn operates the fifth cogwheel 92 on the countershaft 18. The fifth cogwheel 92 in turn operates the output shaft 20 of the gearbox 2 via the sixth cogwheel 94, which is arranged on the output shaft 20 of the gearbox 2. The vehicle 1 is now driven with the second gear engaged.

When the countershaft 18 is made to rotate by the third cogwheel 76, the fourth cogwheel 82 will also rotate. Thus, the countershaft 18 operates the fourth cogwheel 82, which in turn operates the fourth pinion gear 80 on the second main shaft 36. When the second main shaft 36 rotates, the second planetary wheel carrier 51 will also rotate, and thus, depending on the rotational speed of the output shaft 97 of the combustion engine 4, and thus the rotational speed in the first planetary wheel carrier 50, it will cause the second internal ring gear 28 and the second rotor 30 of the second electrical machine 16 to rotate. It is thus possible to allow the second electrical machine 16 to operate as a generator to supply power to the energy storage device 46, and/or to supply power to the first electrical machine 14. The second electrical machine 16 may also emit a torque injection, by way of the control device 48 controlling the second electrical machine 16 to provide a propulsion torque.

In order to shift from the second gear to the third gear, the fourth cogwheel 82 on the countershaft 18 must be disconnected from the countershaft 18 with the fourth coupling element 90, so that the fourth cogwheel 82 may rotate freely in relation to the countershaft 18. Subsequently, the countershaft 18 is connected with the second cogwheel 70 on the countershaft 18 via the second coupling element 86. In order to achieve a connection of the countershaft 18 and the second cogwheel 70 on the countershaft 18, preferably the second electrical machine 16 is controlled in such a way that a synchronous rotational speed arises between the countershaft 18 and the second cogwheel 70 on the countershaft 18. A synchronous rotational speed may be achieved by way of measuring the rotational speed in the second rotor 30 in the second electrical machine 16, and measuring the rotational speed in the output shaft 20. Thus, the rotational speed in the second main shaft 36 and the rotational speed in the countershaft 18 may be determined by way of given gear ratios. The rotational speed of the respective shafts 18, 36 is controlled, and when a synchronous rotational speed has arisen between the countershaft 18 and the second cogwheel 70, the countershaft 18 and the second cogwheel 70 are connected with the assistance of the second coupling element 86.

In order to complete the shift from a second gear to the third gear, the locking between the first sun wheel 26 and the first planetary wheel carrier 50 must cease, which is achieved by way of the first and/or the second electrical machine 14, 16 being controlled in such a way that torque balance prevails in the first planetary gear 10, following which the first coupling device 56 is controlled, in such a way that it disconnects the first sun wheel 26 and the first planetary wheel carrier 50 from each other. Subsequently, the combustion engine 4 is controlled in such a way that a synchronous rotational speed arises between the second sun wheel 32 and the second planetary wheel carrier 51, so that the second coupling device 58 may be engaged in order thus to connect the second sun wheel 32 with the second planetary wheel carrier 51, via the coupling sleeve 57. By synchronizing the control of the combustion engine 2 and the second and first electrical machine 14 and 16, respectively, a soft and disruption-free transition from the second to the third gear may be carried out.

The third cogwheel 76 is disconnected by controlling the first electrical machine 14 in such a way that a substantially zero torque state arises between the countershaft 18 and the third cogwheel 76. When a substantially zero torque state arises, the third cogwheel 76 is disconnected from the countershaft 18 by controlling the third coupling element 88, so that it releases the third cogwheel 76 from the countershaft 18. Subsequently, the first electrical machine 14 is controlled in such a way that a synchronous rotational speed arises between the countershaft 18 and the first cogwheel 64. When a synchronous rotational speed arises, the first cogwheel 64 is connected to the countershaft 18 by way of controlling the first coupling element 84, so that it connects the first cogwheel 64 on the countershaft 18. A synchronous rotational speed may be determined, since the rotational speed of the first rotor 24 in the first electrical machine 14 is measured and the rotational speed of the output shaft 20 is measured, following which the rotational speeds of the shafts 18, 34 are controlled in such a way that a synchronous engine speed arises. Thus, the rotational speed of the first main shaft 34 and the rotational speed of the countershaft 18 may be determined by way of given gear ratios.

The second main shaft 36 now rotates with the same rotational speed as the output shaft 97 of the combustion engine 4, and the second main shaft 36 now operates the second pinion gear 68 via the second main shaft 36. Since the second cogwheel 70 is in engagement with the second pinion gear 68 and is connected with the countershaft 18, the second cogwheel 70 will operate the countershaft 18, which in turn operates the fifth cogwheel 92 on the countershaft 18. The fifth cogwheel 92 in turn operates the output shaft 20 of the gearbox 2 via the sixth cogwheel 94, which is arranged on the output shaft 20 of the gearbox 2. The vehicle 1 is now driven in a third gear.

When the countershaft 18 is made to rotate by the second cogwheel 70 on the countershaft 18, the first cogwheel 64 on the countershaft 18 will also rotate. Thus, the countershaft 18 operates the first cogwheel 64, which in turn operates the first pinion gear 62 on the first main shaft 34. When the first main shaft 34 rotates, the first sun wheel 26 will also rotate, and thus, depending on the rotational speed of the output shaft 97 of the combustion engine 4, and thus the rotational speed of the first planetary wheel carrier 50, it will cause the first internal ring gear 22 and the first rotor 24 of the second electrical machine 16 to rotate. It is thus possible to allow the first electrical machine 14 to operate as a generator to supply power to the energy storage device 46, and/or to supply power to the second electrical machine 16. Alternatively, the first electrical machine 14 may emit a torque injection, by way of the control device 48 controlling the first electrical machine 14 to provide a driving torque.

In order to complete the shift from the third to the fourth gear, the locking between the second sun wheel 32 and the second planetary wheel carrier 51 must cease, which is achieved by way of the first and/or the second electrical machine 14, 16 being controlled in such a way that torque balance is created in the second planetary gear 12, following which the second coupling device 58 is controlled in such a way that it disconnects the second sun wheel 32 and the second planetary wheel carrier 51 from each other. Subsequently, the first ring gear 22 is decelerated, and when the first ring gear 22 is at a standstill the third coupling device 59 is controlled in such a way that the first ring gear 22 is connected and joined with the gear house 42. By synchronizing the control of the combustion engine 4 and the second and first electrical machine 14 and 16, respectively, a soft and disruption-free transition from a third to a fourth gear may be carried out.

The first main shaft 34 is now operated by the output shaft 97 of the combustion engine 4, and the first main shaft 34 now operates the first pinion gear 62. Since the first cogwheel 64 is in engagement with the first pinion gear 62 and is connected with the countershaft 18, the first cogwheel 64 will operate the countershaft 18, which in turn operates the fifth cogwheel 92 on the countershaft 18. The fifth cogwheel 92 in turn operates the output shaft 20 of the gearbox 2 via the sixth cogwheel 94, which is arranged on the output shaft 20 of the gearbox 2. The vehicle 1 is now driven in a fourth gear.

When the countershaft 18 is made to rotate by the first cogwheel 64, the second cogwheel 70 on the countershaft 18 will also rotate. Thus, the countershaft 18 operates the second cogwheel 70, which in turn operates the second pinion gear 68 on the second main shaft 36. When the second main shaft 36 rotates, the second planetary wheel carrier 51 will also rotate, and thus, depending on the rotational speed of the output shaft 97 of the combustion engine 4 and thus the rotational speed in the first planetary wheel carrier 50, it will cause the second sun wheel 32 and the second rotor 28 of the second electrical machine 16 to rotate. It is thus possible to allow the second electrical machine 16 to operate as a generator to supply power to the energy storage device 46, and/or to supply power to the first electrical machine 14. Alternatively, the second electrical machine 16 may also emit a torque injection by way of the control device 48, controlling the second electrical machine 16 in order to provide a propulsion torque.

In order to shift from the fourth gear to the fifth gear, the first electrical machine 14 is controlled, in such a way that torque balance prevails between the first ring gear 22 and the gearbox house 42. When torque balance prevails between the first ring gear 22 and the gear house 42, the third coupling device 59 is controlled in such a way that the first ring gear 22 is disconnected from the gear house 42. Subsequently, the first electrical machine 14 is controlled in such a way that a substantially zero torque state arises between the countershaft 18 and the first cogwheel 64. When a substantially zero torque state arises between the countershaft 18 and the first cogwheel 64, the first coupling element 84 is controlled in such a way that the first cogwheel 64 is disconnected from the countershaft 18. Thus, the fourth gear has been disengaged. In order to engage the fifth gear, the first electrical machine 14 is controlled in such a way that a synchronous rotational speed arises between the first main shaft 34 and the output shaft 20. When a synchronous rotational speed arises between the first main shaft 34 and the output shaft 20, the coupling mechanism 96 is controlled in such a way that the first main shaft 34 and the output shaft 20 are connected and joined with each other. Subsequently, the first electrical machine 14 is controlled in such a way that a substantially zero torque state arises between the countershaft 18 and the first cogwheel 92 of the fifth gear pair 21. When a substantially zero torque state arises between the countershaft 18 and the fifth cogwheel 92, the fifth coupling element 93 is controlled in such a way that the fifth cogwheel 92 is disconnected from the countershaft 18. Subsequently, the first electrical machine 14 is controlled in such a way that a synchronous rotational speed arises between the countershaft 18 and the first cogwheel 64. When a synchronous rotational speed arises between the countershaft 18 and the first cogwheel 64, the coupling element 84 is controlled in such a way that the first cogwheel 64 is connected and joined with the countershaft 18. Finally, the combustion engine 4 is controlled in such a way that the second ring gear 28 comes to a standstill in relation to the gear house 42. When the second ring gear 28 is at a standstill, the fourth coupling device 61 is controlled in such a way that the second ring gear 28 is connected and locked with the gear house 42. Thus, the vehicle 1 is now driven in the fifth gear.

When the fifth gear is engaged, torque from the combustion engine 4 will pass the first and second planetary wheel carriers 50, 51 and be transferred from the second main shaft 36 via the second gear pair 66 to the countershaft 18, and further along via the first gear pair 60 to the first main shaft 34, in order subsequently to be transferred to the output shaft 20 via the coupling mechanism 96.

In order to shift from the fifth gear to the sixth gear, the second electrical machine 16 is controlled in such a way that torque balance prevails between the second ring gear 28 and the gear house 42. When torque balance prevails between the second ring gear 28 and the gear house 42, the fourth coupling device 61 is controlled in such a way that the second ring gear 28 is disconnected from the gear house 42. Subsequently the combustion engine 4 is controlled in such a way that a synchronous rotational speed arises between the first sun wheel 26 and the first planetary wheel carrier 50. When a synchronous rotational speed arises between the first sun wheel 26 and the first planetary wheel carrier 50, the first coupling device 56 is controlled in such a way that the first sun wheel 26 is connected and joined with the first planetary wheel carrier 50. Subsequently, the first electrical machine 16 is controlled in such a way that a substantially zero torque state arises between the countershaft 18 and the first cogwheel 64. When a substantially zero torque state arises between the countershaft 18 and the first cogwheel 64, the coupling element 84 is controlled in such a way that the first cogwheel 64 is disconnected from the countershaft 18. Finally, the second electrical machine 16 is controlled in such a way that a synchronous rotational speed arises between the countershaft 18 and the third cogwheel 76. When a synchronous rotational speed arises between the countershaft 18 and the third cogwheel 76, the coupling element 88 is controlled in such a way that the third cogwheel 76 is connected and joined with the countershaft 18. Thus, the vehicle 1 is now driven in the sixth gear.

When the sixth gear is engaged, torque from the combustion engine 4 will be transferred from the first planetary wheel carrier 50 to the first sun wheel 26, and further along to the first main shaft 34, in order subsequently to be transferred to the output shaft 20 via the coupling mechanism 96.

In order to shift from the sixth gear to the seventh gear the first and/or the second electrical machines 14, 16 is controlled in such a way that torque balance prevails in the second planetary gear 12. When torque balance prevails in the second planetary gear 12, the first coupling device 56 is controlled in such a way that the first sun wheel 26 is disconnected from the first planetary wheel carrier 50. Subsequently the combustion engine 4 is controlled in such a way that a synchronous rotational speed arises between the second sun wheel 32 and the second planetary wheel carrier 51. When a synchronous rotational speed arises between the second sun wheel 32 and the second planetary wheel carrier 51, the second coupling device 58 is controlled in such a way that the second sun wheel 32 is connected and joined with the second planetary wheel carrier 51. Thus, the vehicle 1 is now driven in the seventh gear.

When the seventh gear is engaged, torque from the combustion engine 4 will pass the first planetary wheel carrier 50 and further along to the second main shaft 36. Subsequently, torque is transferred from the second main shaft 36 via the second gear pair 66 to the countershaft 18, and further via the third gear pair 72 to the first main shaft 34, in order subsequently to be transferred to the output shaft 20 via the coupling mechanism 96.

According to the embodiment above, the gearbox 2 comprises pinion gears 62, 68, 74, 80 and cogwheels 64, 70, 76, 82 arranged on the main shafts 34, 36 and the countershaft 18, respectively, to transfer rotational speed and torque. However, it is possible to use another type of transmission, such as chain and belt drives, to transfer rotational speed and torque in the gearbox 2.

The transmission device 19 has four gear pairs 60, 66, 72, 78 according to the example embodiment. However, the transmission device 19 may comprise any number of gear pairs.

Figure 3:
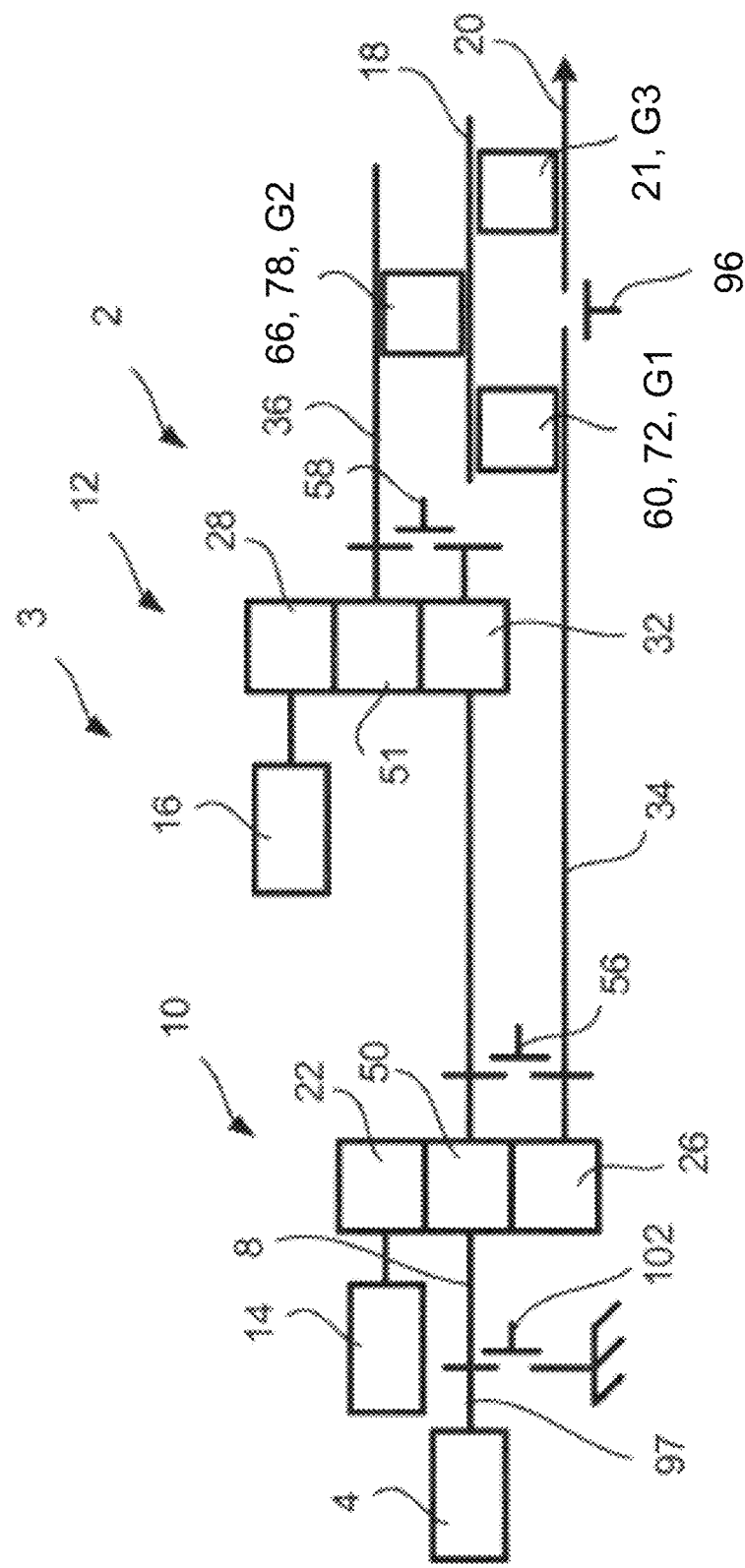
FIG. 3 shows a schematic side view of a hybrid powertrain, adapted to be controlled according to the method according to the present invention.

FIG. 3 illustrates the hybrid powertrain 3 according to FIG. 2 in a simplified view, where some components have been excluded in the interest of clarity. G1 in FIG. 3 consists of at least one gear pair connected with the first main shaft 34 and therefore with the first planetary gear 10, and a gear pair G2 consists of at least one gear pair connected with the second main shaft 36 and therefore with the second planetary gear 12. These gear pairs G1, G2 are also connected to the output shaft 20 via the countershaft 18. G1 and G2, respectively, may consist of one or several gear pairs. The gear pair G1, connected with the first planetary gear 10, may for example consist of the first gear pair 60 and/or the third gear pair 72, as described in FIG. 2. The gear pair G2, connected with the second planetary gear 12, may for example consist of the second gear pair 66 and/or the fourth gear pair 78, as described in FIG. 2. Further, at least one gear pair G3, connected with the output shaft 20 and the countershaft, 18 is displayed, which may consist of the fifth gear pair 21 described in FIG. 2. G3 may consist of one or several gear pairs. Alternatively, the output shaft 20 may be omitted, so that torque may be extracted directly from the countershaft 18, which thus constitutes the output shaft.

The at least one gear pair G1, 60, 72, connected with the first planetary gear 10 comprises at least one pinion gear 62, 74 and one cogwheel 64, 76 arranged in engagement with each other, which pinion gear 62, 74 may be arranged in such a way that it may be connected with and disconnected from the main shaft 34, arranged with the first planetary gear 10. The at least one cogwheel 64, 76 may be arranged so that it may be connected with and disconnected from the countershaft 18.

The at least one gear pair G2, 66, 78, connected with the second planetary gear 12, comprises at least one pinion gear 68, 80 and one cogwheel 70, 82 arranged in engagement with each other, which pinion gear 68, 80 may be arranged in such a way that it may be connected with and disconnected from the second main shaft 36, arranged with the first planetary gear 12. The at least one cogwheel 70, 82 may be arranged so that it may be connected with and disconnected from the countershaft 18.

In FIG. 3, the third and fourth coupling devices 59 and 61 have been excluded. According to this embodiment of the invention, it is still possible to drive the vehicle in a number of operating modes and driving modes. As an example, the shift from one gear to another will be described. The components displayed in FIG. 2 and FIG. 3 are used to describe the shifting process. A gear is engaged when the first coupling device 56 is connected, and thus joins the first sun wheel 26 and a first planetary wheel carrier 50 arranged in the first planetary gear 10 with each other, while simultaneously the second coupling device 58 is disconnected, and thus disconnects the second sun wheel 32 and the second planetary wheel carrier 51, arranged in the second planetary gear 12, are from each other. At this gear the first main shaft 34 is operated by the output shaft 97 of the combustion engine 4, and when needed by the first electrical machine 14, which results in the first main shaft 34 operating the first pinion gear 62. Since the first cogwheel 64 is in engagement with the first pinion gear 62 and is connected with the countershaft 18 via the first coupling element 84, the first cogwheel 64 will operate the countershaft 18, which in turn operates the fifth cogwheel 92 on the countershaft 18. The fifth cogwheel 92 in turn operates the output shaft 20 of the gearbox 2 via the sixth cogwheel 94, which is arranged on the output shaft 20 of the gearbox 2.

In order to shift to a next gear, the second electrical machine 16 is controlled in such a way that a propulsion torque is generated via the second main shaft 36 and via the second gear pair 66, whereat the second cogwheel 70 of the second gear pair 66 is connected to the countershaft 18 via the second coupling element 86. The propulsion torque further transmitted via the fifth gear pair 21 and finally to the output shaft 20.

In order to disengage the first cogwheel 64 from the countershaft 18, so that the fourth gear is disconnected, the combustion engine 4 and the first electric machine 14 are first controlled in such a way that the first cogwheel 64 is brought to a substantially zero torque state in relation to the countershaft 18. When a substantially zero torque state has arisen, the first coupling element 84 is disengaged, so that the first cogwheel 64 is disconnected from the countershaft 18.

Subsequently, the rotational speed of the first main shaft 34 is synchronized with the rotational speed of the output shaft 20, following which the coupling mechanism 96 is controlled in such a way that it connects the first main shaft 34 with the output shaft 20.

Subsequently, the combustion engine 4 and the first electrical machine 14 are controlled in such a way that the propulsion torque occurs via the first main shaft 34 and via the coupling mechanism 96, and further along to the output shaft 20. By reducing the propulsion torque from the second electrical machine 16, the fifth coupling element 93 may be brought to a substantially zero torque state in relation to the countershaft 18. When a substantially zero torque state has arisen, the fifth coupling element 93 is disengaged, so that the fifth cogwheel 92 of the fifth gear pair 21 is disconnected from the countershaft 18.

Subsequently, with the help of the second electrical machine 16, the rotational speed of the countershaft 18 is synchronized with the rotational speed of the third cogwheel 76, following which the third coupling element 88 is controlled in such a way that it connects the third cogwheel 76 with the countershaft 18. When this connection has been completed, the propulsion torque may be shared between the combustion engine 4, the first electrical machine 14 and the second electrical machine 16. Subsequently, torque balance is created in the first planetary gear 10, following which the first coupling device 56 disconnects the first planetary wheel carrier 50 and the first sun wheel 26 from each other. Finally, the second planetary wheel carrier 51 is rotational speed synchronized with the second sun wheel 32, following which the second coupling device 58 connects the second planetary wheel carrier 51 and the second sun wheel 32 with each other.

As described, torque is extracted from the gearbox 2, from the output shaft 20. It is also possible to extract torque directly from the first or second main shaft 34, 36, or directly from the countershaft 18. Torque may also be extracted in parallel from two or all of the three shafts 18, 34, 36 simultaneously.

Below is a description of an embodiment for control of the hybrid powertrain 3, which may for example be applied when moving off the vehicle 1. The third and fourth coupling devices 59 and 61 have been excluded, since they are not needed in the method to control the hybrid powertrain 3.

In order to move off the vehicle, first the combustion engine 4 is started, unless it already has been started, and subsequently, the first sun wheel 26 and the first planetary wheel carrier 50 are disconnected from each other with the first coupling device 56, and the second sun wheel 32 and the second planetary wheel carrier 51 are disconnected from each other with the second coupling device 58. In order to transmit torque to the output shaft 20, gears corresponding to the third and fourth gear pairs 72, 78 are engaged, by way of connecting the third and fourth cogwheels 76, 82 to the countershaft 18 to engage the gears.

The fifth cogwheel 92 of the fifth gear pair 21, which is arranged to be disconnectable on the countershaft 18, is locked on the countershaft 18. Subsequently, the first electrical machine 14 and the second electrical machine 16 are activated, so that the first electrical machine 14 rotates in the opposite direction to the second electrical machine 16, which entails that a torque is generated in the output shaft 20. The first electrical machine 14 is activated to exert a first torque $T_1$, and the second electrical machine 16 is activated to exert a second torque $T_2$, wherein the size of the first and the second torque $T_1$, $T_2$ influence the power output P from the first and the second electrical machines 14, 16.

The desired powertrain torque $T_D$, and therefore the desired torque in the output shaft 20, are created by way of a combination of torque from the first and second electrical machines 14, 16, according to the equations E1 and E1' below. At the same time, the total power consumed by the first and the second electrical machines 14, 16 will vary according to the equation E2 below. A given torque may thus be produced with different total power consumptions. If a certain power consumption is desired, the two equations are combined, wherein the torque from the first and the second electrical machines 14, 16 is obtained from the solution of the two equations E1 and E2, and E1' and E2, respectively.

In cases where the gear pair G3, which is connected with the countershaft 18 and the output shaft 20, is connected and locked on the countershaft 18, and a coupling mechanism S6, 96, arranged between the first main shaft 34 and the output shaft 20 is open, the torque $T_D$ desired in the output shaft 20 of the gearbox, also referred to as the powertrain torque, may be obtained through a combination of torque from the first and the second electrical machines 14, 16, according to the equation E1 below:

$$T_D = -T_1 K_1 \frac{1}{G_1 G_3} + T_2 K_2 \frac{1}{G_2 G_3} \quad [\text{E1}]$$

where $T_1$ is the torque that the first electrical machine 14 emits and $T_2$ is the torque emitted by the second electrical machine 16. $K_1$ and $K_2$ are constants, which are determined by the number of cogs on the component parts of the respective planetary gears 10, 12. G1 is the gear ratio between the first main shaft 34 and the countershaft 18, G2 is the gear ratio between the second main shaft 36 and the countershaft 18, and G3 is the gear ratio between the countershaft 18 and the output shaft 20, for the selected connected gear pairs.

In cases where the gear pair G3, which is connected with the countershaft 18 and the output shaft 20, is disconnected from the countershaft 18, and the coupling mechanism 96 is locked and thus connects the first main shaft 34 and the output shaft 20, the torque $T_D$ in the output shaft 20 of the gearbox is determined by the equation E1' below:

$$T_D = -T_1 K_1 + T_2 K_2 \frac{G_1}{G_2} \quad [\text{E1}']$$

$$P_E = (T_1 n_1 + T_2 n_2) \frac{2\pi}{60} \quad [\text{E2}]$$

$n_1$ is the engine speed of the first electrical machine 14 and $n_2$ is the engine speed of the second electrical machine 16.

The total power $P_E$ from the electrical machines 14, 16 must, according to the innovative method, cancel each other out, so that the sum of the power $P_E$ becomes zero, having regard to the electrical losses in the electrical machines 14, 16, so that the energy storage device 46 will not be used. It is thus possible according to the invention to select a first and a second torque $T_1$, $T_2$, which the electrical machines must generate in order to obtain a certain power output in each one of the electrical machines 14, 16, wherein the sum of the power output $P_E$ from the first and second electrical machine 14, 16 is zero. While moving off, the first electrical machine 14 is used to control the voltage between the electrical machines 14, 16. The second electrical machine 16 is controlled in order to emit a desired torque $T_2$. Thus, the frequency of extraction and supply of power from and to the energy storage device 46 decreases, which results in an increase of the life of the energy storage device 46. Thus, it is also possible that the energy storage device may be excluded.

When the second sun wheel 32 and the second planetary wheel carrier 51 rotate with a synchronous rotational speed, the second sun wheel 32, arranged in the second planetary gear 12, and a second planetary wheel carrier 51 are connected with each other, via the second coupling device 58, so that the vehicle 1 may be operated exclusively by the combustion engine 4.

According to another embodiment of the method, it is ensured that the first planetary gear's rotatable components are locked with each other, and that the second planetary gear's rotatable components are disconnected from each other. According to the invention, the first electrical machine controls the voltage between the electrical machines, while simultaneously the second electrical machine is controlled in order to emit a predetermined torque.

According to another embodiment of the method, it is ensured that the first planetary gear's rotatable components are disconnected from each other, and that two of the second planetary gear's rotatable components are locked with each other. According to the invention, the second electrical machine controls the voltage between the electrical machines, while simultaneously the first electrical machine is controlled in order to emit a predetermined torque.

These embodiments are applicable at different operating modes in the hybrid powertrain 3 and the vehicle 1, in which the hybrid powertrain 3 is arranged.

The method to control a hybrid drive line 3 according to the invention, comprises a combustion engine 4; a gearbox with an input shaft 8 and an output shaft 20, which combustion engine is connected to the input shaft 8; a first planetary gear 10, which is connected to the input shaft 8: a second planetary gear 12, connected to the first planetary gear 10; a first electrical machine 14, connected to the first planetary gear 10; a second electrical machine 16, connected to the second planetary gear 12; at least one gear pair G1, 60, 72 connected with the first planetary gear 10 and the output shaft 20; and at least one gear pair G2, 66, 78 connected with the second planetary gear 12 and the output shaft 20.

Figure 4A:
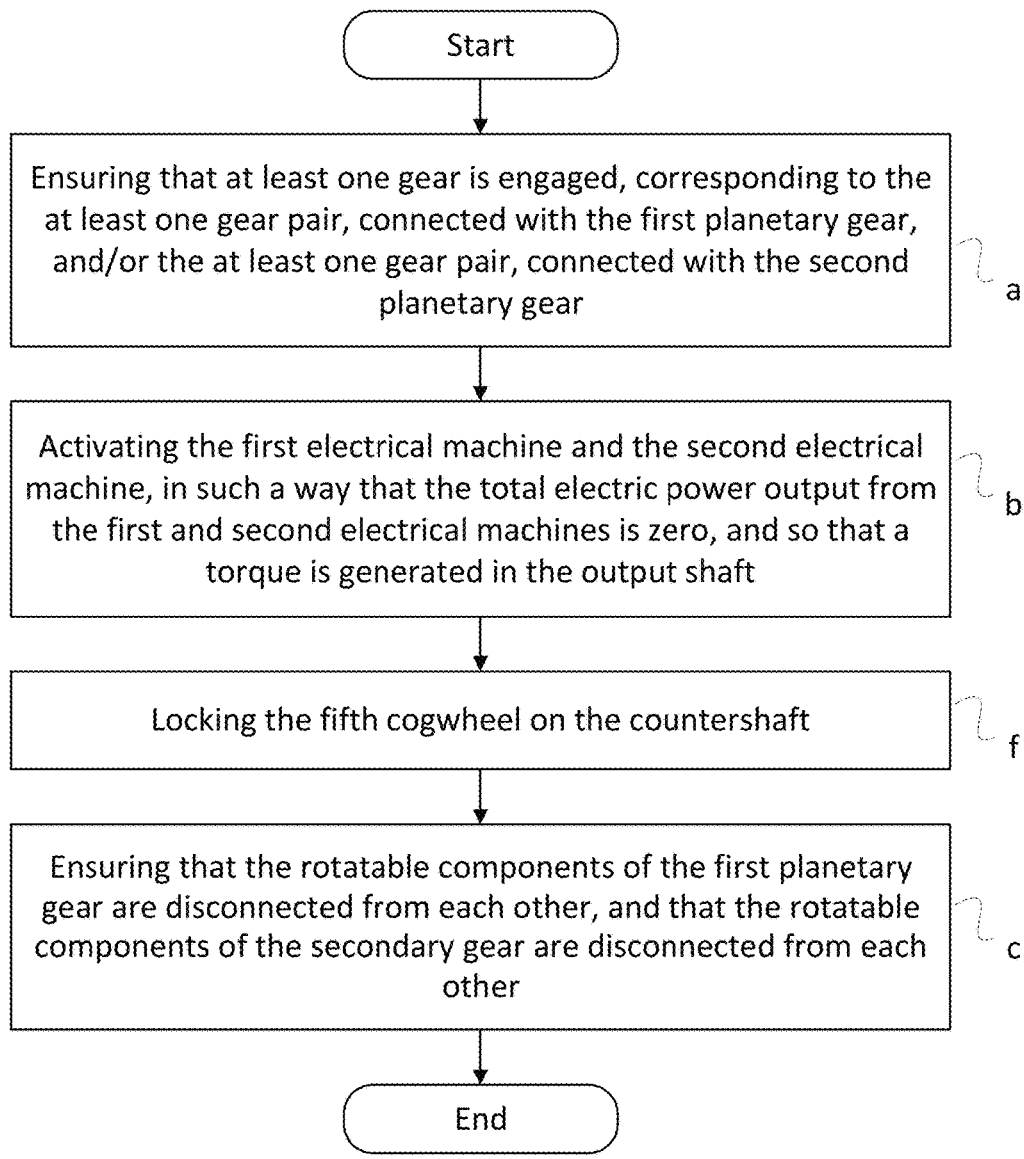
FIG. 4a-4c show flow charts with respect to embodiments of the method to control a hybrid powertrain according to the present invention.
Figure 4B:
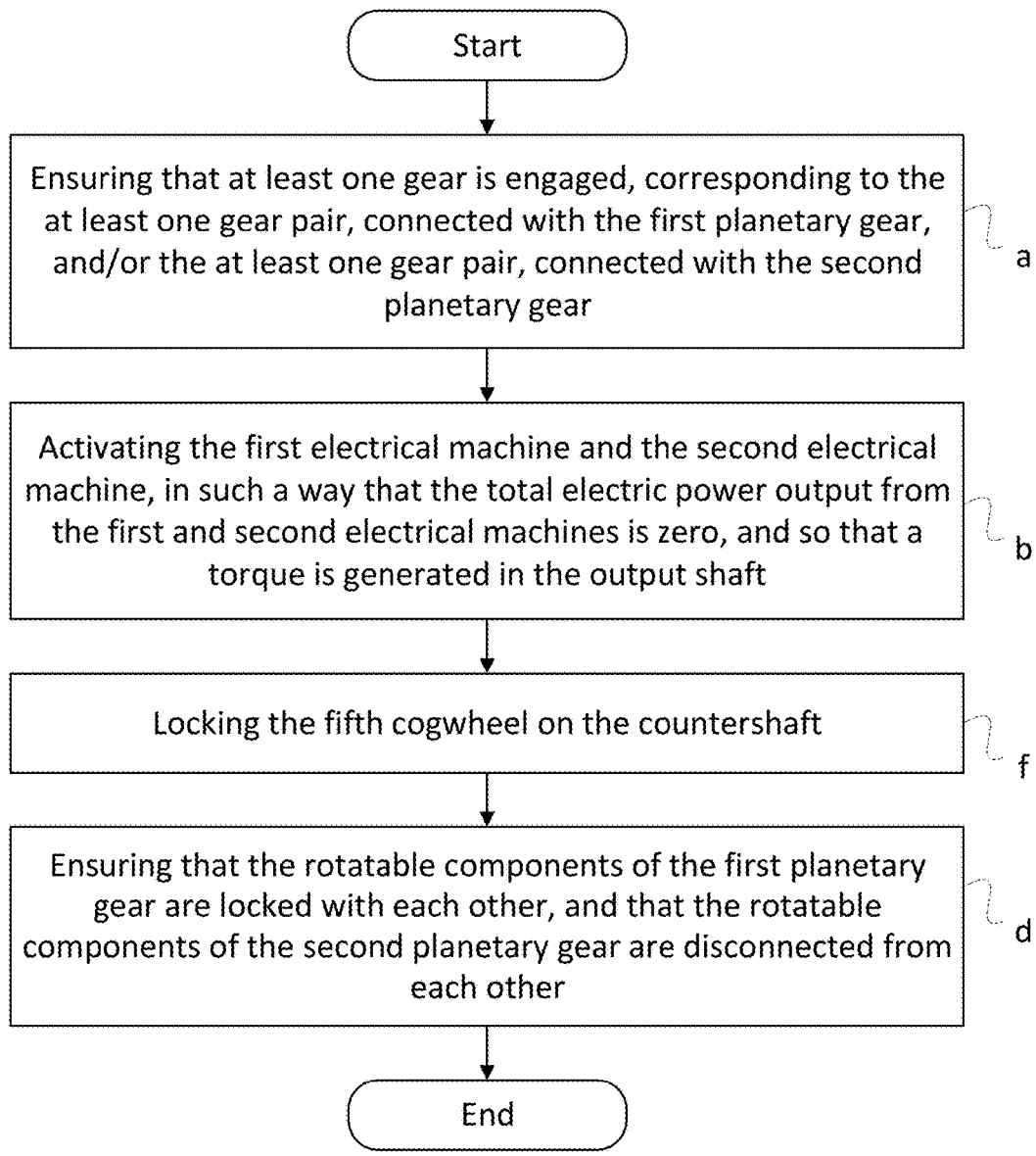
Figure 4C:
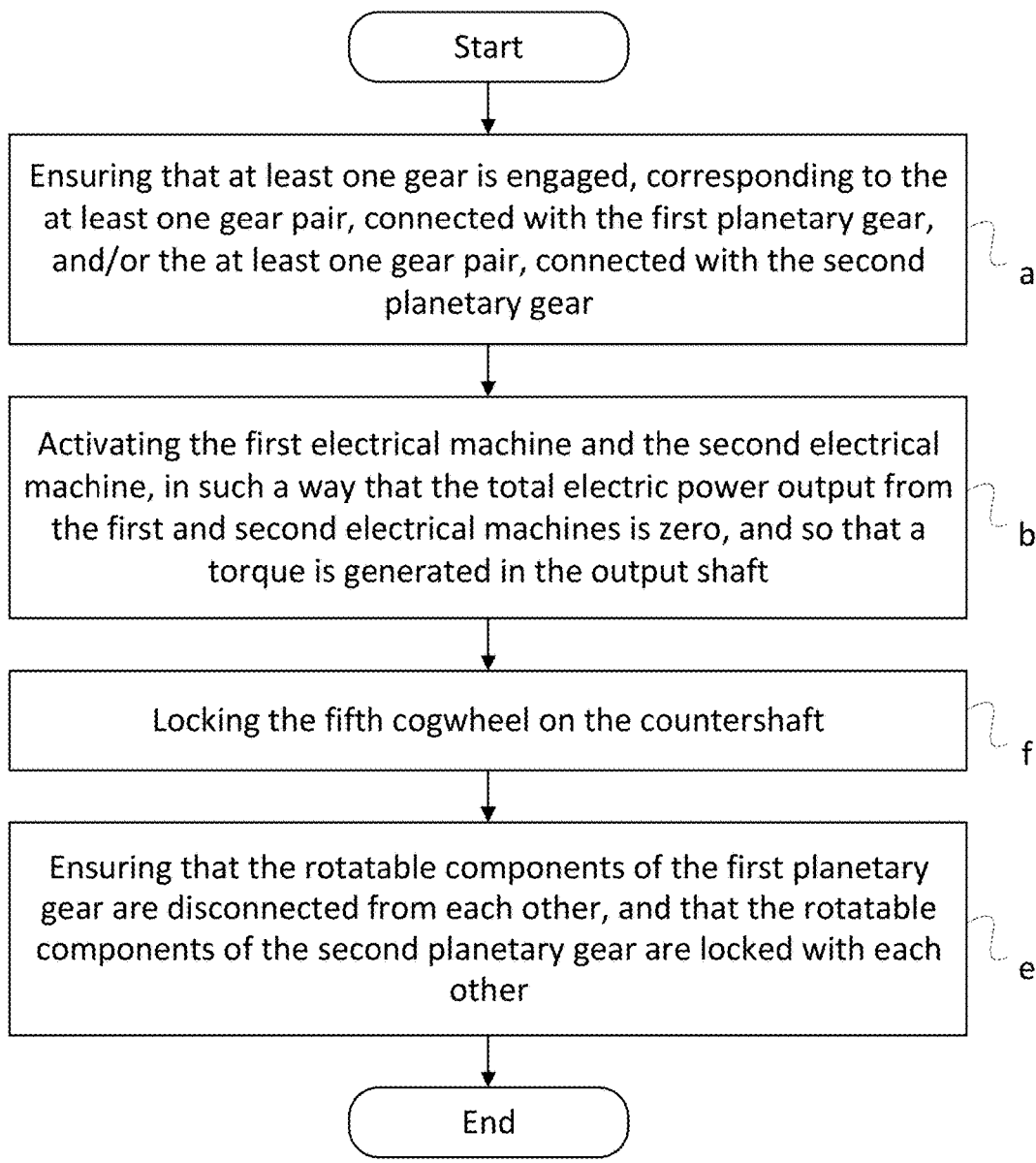

FIGS. 4*a*-4*c* show flow charts relating to embodiments of the innovative method for control of the hybrid powertrain 3. The first embodiment, which is displayed in FIG. 4*a* comprises the steps:
  a) to ensure that at least one gear is engaged, corresponding to the at least one gear pair G1, 60, 72, connected with the first planetary gear 10, and/or the at least one gear pair G2, 66, 78, connected with the second planetary gear 12, and
  b) to activate the first electrical machine 14 and the second electrical machine 16, in such a way that the total electric power output from the first and second electrical machines 14, 16 is zero, and so that a torque is generated in the output shaft 20.

Preferably, a torque is generated in the output shaft 20 via the combustion engine 4 and via at least one of the first and the second electrical machines 14, 16. Preferably, in the additional step c), it is ensured that the rotatable components 26, 50 of the first planetary gear 10 are disconnected from each other, and that the rotatable components 32, 51 of the second planetary gear 12 are disconnected from each other.

Preferably a first sun wheel 26 and a first planetary wheel carrier 50, arranged in the first planetary gear 10, are disconnected from each other in step c) with the use of a first coupling device 56; and a second sun wheel 32 and a second planetary wheel carrier 51, arranged in the second planetary gear 12, are disconnected from each other with the use of a second coupling device 58.

Preferably, in step c) the first electrical machine 14 is controlled to control the voltage between the electrical machines 14, 16, while simultaneously the second electrical machine 16 is controlled to emit a predetermined torque $T_2$.

According to another embodiment, displayed in FIG. 4*b*, in the additional step d), it is ensured that the rotatable components 26, 50 of the first planetary gear 10 are locked with each other, and that the rotatable components 32, 51 of the second planetary gear 12 are disconnected from each other.

Preferably a first sun wheel 26 and a first planetary wheel carrier 50, arranged in the first planetary gear 10, are locked with each other in step d), with the use of a first coupling device 56; and a second sun wheel 32 and a second planetary wheel carrier 51, arranged in the second planetary gear 12, are disconnected from each other with the use of a second coupling device 58.

Preferably, in step d) the first electrical machine 14 is controlled to control the voltage between the electrical machines 14, 16, while simultaneously the second electrical machine 16 is controlled to emit a predetermined torque $T_2$.

According to another embodiment, displayed in FIG. 4*c*, in the additional step e), it is ensured that the rotatable components 26, 50 of the first planetary gear 10 are disconnected from each other, and that the rotatable components 32, 51 of the second planetary gear 12 are locked with each other.

Preferably a first sun wheel 26 and a first planetary wheel carrier 50, arranged in the first planetary gear 10, are disconnected from each other in step e) with the use of a first coupling device 56; and a second sun wheel 32 and a second planetary wheel carrier 51, arranged in the second planetary gear 12, are locked with each other with the use of a second coupling device 58.

Preferably, in step e) the second electrical machine 16 is controlled to control the voltage between the electrical machines 14, 16, while simultaneously the first electrical machine 14 is controlled to emit a predetermined torque $T_1$.

Preferably, the combustion engine 4 is connected with the first planetary wheel carrier 50, which is connected with the second sun wheel 32.

Preferably, the at least one gear pair G1, 60, 72, connected with the first planetary gear 10, comprises at least one pinion gear 62, 74 and cogwheel 64, 76 in engagement with each other, which pinion gear 62, 74 is arranged to be connectible and disconnectable on a first main shaft 34, arranged with the first planetary gear 10, and which cogwheel 64, 76 is arranged to be connectible and disconnectable on a countershaft 18; and the at least one gear pair G2, 66, 78, connected with the second planetary gear 12 comprises at least one pinion gear 68, 80 and cogwheel 70, 82 in engagement with each other, which pinion gear 68, 80 is arranged to be connectible and disconnectable on a second main shaft 36, arranged with the first planetary gear 12, and which cogwheel 70, 82 is arranged to be connectible and disconnectable on a countershaft 18, wherein in step a) the pinion gears 62, 74, 68, 80 are connected to the main shafts 34, 36 and the cogwheels 64, 76, 70, 82 are connected to the countershaft 18 to engage the gears.

Preferably, there is at least one gear pair G3, 21 connected with a countershaft 18 and the output shaft 20, comprising a fifth cogwheel 92, which is arranged to be disconnectable on the countershaft 18, and after the step b), in step f), the fifth cogwheel 92 is locked on the countershaft 18.

Preferably, in step b) the first and the second electrical machines 14, 16 are activated in such a way that the first electrical machine 14 rotates in the opposite direction to the second electrical machine 16.

Preferably, the first electrical machine 14 is activated in step b) to exert a first torque $T_1$, and the second electrical machine 16 is activated to exert a second torque $T_2$, wherein the size of the first and the second torque $T_1$, $T_2$ influences the power output P from the first and the second electrical machines 14, 16 to the output shaft 20.

According to the invention, a computer program stored in the control device 48 and/or in the computer 53, which computer program may comprise procedures to control the hybrid powertrain, is provided.

The program P may be stored in an executable manner, or in a compressed manner, in a memory M and/or a read/write memory R.

The invention also relates to a computer program product, comprising program code stored in a medium readable by a computer, in order to perform the method steps specified above, when said program code is executed in the control device 48, or in another computer 53 connected to the control device 48. Said program code may be stored in a non-volatile manner on said medium readable by a computer 53.

The components and features specified above may, within the framework of the invention, be combined between different embodiments specified.

The invention claimed is:

1. A method to control a hybrid powertrain, comprising a combustion engine; a gearbox with an input shaft and an output shaft; a first planetary gear, which is connected to the input shaft and a first main shaft; a second planetary gear, which is connected to the first planetary gear and a second main shaft; a first electrical machine, which is connected to the first planetary gear; a second electrical machine, which is connected to the second planetary gear, wherein the first and second electrical machines may operate each other, whereby electrical power from one of said electrical machines is provided to the other of said electrical machines; at least one gear pair connected with the first planetary gear and the output shaft; and at least one gear pair connected with the second planetary gear and the output shaft, wherein the combustion engine is connected with a first planetary wheel carrier, arranged in the first planetary gear via the input shaft, and wherein the second main shaft is connected with a second planetary wheel carrier, arranged in the second planetary gear,
said method comprising the steps, while the combustion engine is in operation:
ensuring that at least one gear is engaged, corresponding to the at least one gear pair connected with the first planetary gear and/or corresponding to the at least one gear pair connected with the second planetary gear; and
activating the first electrical machine and the second electrical machine, in such a way that the total electric power output from the first and second electrical machines is substantially zero, and in such a way that a torque is provided to the output shaft.

2. A method according to claim 1, wherein said first and second planetary gears each comprise rotatable components that are selectively connectible to each other, and said method further comprising ensuring that the rotatable components of the first planetary gear are disconnected from each other, and that the rotatable components of the second planetary gear are disconnected from each other.

3. A method according to claim 2, wherein the rotatable components for the first planetary gear comprises a first sun wheel and the first planetary wheel carrier, which are selectively connectible to each other, wherein the rotatable components of the second planetary gear comprises a second sun wheel and the second planetary wheel carrier, which are selectively connectible to each other, and wherein said step of ensuring that the rotatable components of the first planetary gear are disconnected from each other, and that the rotatable components of the second planetary gear are disconnected from each other, comprises:
disconnecting, with a first coupling device, the first sun wheel, arranged in the first planetary gear, and the first planetary wheel carrier from each other; and
disconnecting, with a second coupling device, the second sun wheel, arranged in the second planetary gear, and the second planetary wheel carrier from each other.

4. A method according to claim 3, wherein the combustion engine is connected with the first planetary wheel carrier, which is connected with the second sun wheel.

5. A method according to claim 2, wherein, said step of ensuring that the rotatable components of the first planetary gear are disconnected from each other, and that the rotatable components of the second planetary gear are disconnected from each other, further comprises:
controlling the first electrical machine to control the voltage between the first and second electrical machines,
while simultaneously controlling the second electrical machine to emit a predetermined torque.

6. A method according to claim 1, wherein said first and second planetary gears each comprise rotatable components that are selectively connectible to each other, and said method further comprising ensuring that rotatable components associated with the first planetary gear are locked with each other, and that rotatable components associated with the second planetary gear are disconnected from each other.

7. A method according to claim 6, wherein the rotatable components for the first planetary gear comprises a first sun wheel and the first planetary wheel carrier, which are selectively connectible to each other, wherein the rotatable components of the second planetary gear comprises a second sun wheel and the second planetary wheel carrier, which are selectively connectible to each other, and wherein said step of ensuring that the rotatable components of the first planetary gear are locked with each other, and that the rotatable components of the second planetary gear are disconnected from each other further comprises:
locking, with the use of a first coupling device, the first sun wheel, arranged in the first planetary gear, and the first planetary wheel carrier with each other; and
disconnecting, with the use of a second coupling device, the second sun wheel, arranged in the second planetary gear, and the second planetary wheel carrier from each other.

8. A method according to claim 6, wherein said step of ensuring that the rotatable components of the first planetary gear are locked with each other, and that the rotatable components of the second planetary gear are disconnected from each other further comprises:
controlling the first electrical machine to control the voltage between the first and second electrical machines,
while simultaneously controlling the second electrical machine to emit a predetermined torque.

9. A method according to claim 1, wherein said first and second planetary gears each comprise rotatable components that are selectively connectible to each other, and said method further comprising ensuring that the rotatable components of the first planetary gear are disconnected from each other, and that two of a plurality of rotatable components of the second planetary gear are locked with each other.

10. A method according to claim 9, wherein the rotatable components for the first planetary gear comprises a first sun wheel and the first planetary wheel carrier, which are selectively connectible to each other, wherein the rotatable components of the second planetary gear comprises a second sun wheel and the second planetary wheel carrier, which are selectively connectible to each other, and wherein said step of ensuring that the rotatable components of the first planetary gear are disconnected from each other, and that two of the rotatable components of the second planetary gear are locked with each other further comprises:

disconnecting, with the use of a first coupling device, the first sun wheel, arranged in the first planetary gear, and the first planetary wheel carrier from each other; and locking, with the use of a second coupling device, the second sun wheel, arranged in the second planetary gear, and the second planetary wheel carrier with each other.

11. A method according to claim 9, wherein said step of ensuring that the rotatable components of the first planetary gear are disconnected from each other, and that two of the rotatable components of the second planetary gear are locked with each other further comprises:

controlling the second electrical machine to control the voltage between the first and second electrical machines, while simultaneously controlling the first electrical machine to emit a predetermined torque.

12. A method according to claim 1, wherein the at least one gear pair connected with the first planetary gear comprises at least one first pinion gear and first cogwheel, arranged in engagement with each other, which first pinion gear is arranged to be selectively connectible and disconnectable on the first main shaft arranged with the first planetary gear, and which the first cogwheel is arranged to be selectively connectible and disconnectable on a countershaft; and wherein the at least one gear pair connected with the second planetary gear comprises at least one second pinion gear and second cogwheel arranged in engagement with each other, which the second pinion gear is arranged to be selectively connectible and disconnectable on the second main shaft arranged with the first planetary gear, and which the second cogwheel is arranged to be selectively connectible and disconnectable on a countershaft, and wherein said ensuring that at least one gear is engaged, corresponding to the at least one gear pair, connected with the first planetary gear, and/or corresponding to the at least one gear pair connected with the second planetary gear step further comprises connecting the first and second pinion gears to the main shafts, and the first and second cogwheels to the countershaft to engage the gears.

13. A method according to claim 12, wherein at least one gear pair, connected with the countershaft and the output shaft, comprises a further cogwheel, which is arranged to be selectively connectible and disconnectable on the countershaft, and that after the step of activating the first electrical machine and the second electrical machine, in such a way that the total electric power output from the first and second electrical machines is substantially zero, and in such a way that a torque is provided to the output shaft, the method comprises the step of locking the further cogwheel on the countershaft.

14. A method according to claim 1, wherein the step of activating the first electrical machine and the second electrical machine, in such a way that the total electric power output from the first and second electrical machines is substantially zero, and in such a way that a torque is provided to the output shaft further comprises:

activating the first electrical machine to exert a first torque; and activating the second electrical machine to exert a second torque, wherein the size of the first and the second torque influences the power output from the first and the second electrical machines to the output shaft.

15. A vehicle comprising a hybrid powertrain, said hybrid powertrain comprising:

a combustion engine;

a gearbox with an input shaft and an output shaft;

a first planetary gear, which is connected to the input shaft and a first main shaft;

a second planetary gear, which is connected to the first planetary gear and a second main shaft;

a first electrical machine, which is connected to the first planetary gear;

a second electrical machine, which is connected to the second planetary gear, wherein the first and second electrical machines may operate each other, whereby electrical power from one of said electrical machines is provided to the other of said electrical machines;

at least one gear pair, connected with the first planetary gear and the output shaft;

at least one gear pair, connected with the second planetary gear and the output shaft, wherein the combustion engine is connected with a first planetary wheel carrier arranged in the first planetary gear via the input shaft, and wherein the second main shaft is connected with a planetary wheel carrier arranged in the second planetary gear; and an electric control device, which is installed to control the vehicle's moving off, said electronic device configured to:

ensure that at least one gear is engaged, corresponding to the at least one gear pair connected with the first planetary gear, and/or corresponding to the at least one gear pair connected with the second planetary gear; and activate the first electrical machine and the second electrical machine, in such a way that the total electric power output from the first and second electrical machines is substantially zero, and in such a way that a torque is provided to the output shaft.

16. A computer program product comprising computer program code stored on a non-transitory computer readable medium readable by a computer, said computer program product used to control a hybrid powertrain, comprising a combustion engine; a gearbox with an input shaft and an output shaft; a first planetary gear, which is connected to the input shaft and a first main shaft; a second planetary gear, which is connected to the first planetary gear and a second main shaft; a first electrical machine, which is connected to the first planetary gear; a second electrical machine, which is connected to the second planetary gear, wherein the first and second electrical machines may operate each other, whereby electrical power from one of said electrical machines is provided to the other of said electrical machines; at least one gear pair connected with the first planetary gear and the output shaft; and at least one gear pair connected with the second planetary gear and the output shaft, wherein the combustion engine is connected with a first planetary wheel carrier, arranged in the first planetary gear via the input shaft, and wherein the second main shaft is connected with a planetary wheel carrier, arranged in the second planetary gear, said computer program code comprising computer instructions to cause one or more computer processors to perform the operations of:

ensuring that at least one gear is engaged, corresponding to the at least one gear pair connected with the first planetary gear, and/or corresponding to the at least one gear pair connected with the second planetary gear; and activating the first electrical machine and the second electrical machine, in such a way that the total electric power output from the first and second electrical machines is substantially zero, and in such a way that a torque is provided to in the output shaft.

* * * * *